United States Patent
Hirota et al.

(10) Patent No.: US 6,481,200 B1
(45) Date of Patent: Nov. 19, 2002

(54) CATALYST WARMING APPARATUS OF INTERNAL COMBUSTION ENGINE

(75) Inventors: Shinya Hirota, Susono; Toshiaki Tanaka, Numazu, both of (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/690,392

(22) Filed: Oct. 17, 2000

(30) Foreign Application Priority Data

Oct. 22, 1999 (JP) .......................................... 11-300528
Jan. 11, 2000 (JP) ........................................ 2000-006214

(51) Int. Cl.$^7$ ................................................ F01N 3/00
(52) U.S. Cl. ........................... 60/284; 60/286; 60/324; 422/183
(58) Field of Search ........................... 60/274, 284, 285, 60/286, 289, 295, 300, 303, 297; 55/DIG. 30; 422/191, 182, 183; 366/337

(56) References Cited

U.S. PATENT DOCUMENTS

| | | | | |
|---|---|---|---|---|
| 3,952,507 A | * | 4/1976 | Bonarski | 60/303 |
| 4,404,007 A | * | 9/1983 | Tukao et al. | 55/DIG. 30 |
| 4,576,617 A | * | 3/1986 | Renevot | 55/DIG. 30 |
| 4,651,524 A | * | 3/1987 | Brighton | 60/286 |
| 4,969,328 A | * | 11/1990 | Kammel | 60/297 |
| 5,037,619 A | * | 8/1991 | Alagy et al. | 422/191 |
| 5,320,428 A | * | 6/1994 | Streiff | 366/337 |
| 5,425,233 A | | 6/1995 | Ma et al. | |
| 5,465,574 A | * | 11/1995 | Ma | 60/284 |
| 5,497,617 A | * | 3/1996 | Bagley et al. | 60/284 |
| 5,584,178 A | * | 12/1996 | Naegeli et al. | 60/303 |
| 5,595,060 A | * | 1/1997 | Togai et al. | 60/274 |
| 5,685,144 A | * | 11/1997 | Ma | 60/284 |
| 5,727,385 A | * | 3/1998 | Hepburn | 60/297 |
| 5,839,273 A | * | 11/1998 | Maus | 60/286 |
| 6,023,929 A | * | 2/2000 | Ma | 60/295 |
| 6,055,807 A | * | 5/2000 | Schatz et al. | 60/324 |
| 6,138,454 A | * | 10/2000 | Fournier et al. | 60/286 |
| 6,178,743 B1 | * | 1/2001 | Hirota et al. | 60/286 |

FOREIGN PATENT DOCUMENTS

| | | |
|---|---|---|
| EP | 0 935 056 | 8/1999 |
| JP | 04116218 | 4/1992 |
| JP | 05079326 | 3/1993 |
| JP | 06129269 | 5/1994 |
| JP | 08170525 | 7/1996 |
| WO | WO91/16529 | 10/1991 |
| WO | WO94/24423 | 10/1994 |
| WO | WO97/25525 | 7/1997 |

* cited by examiner

*Primary Examiner*—Thomas Denion
*Assistant Examiner*—Tu M. Nguyen
(74) *Attorney, Agent, or Firm*—Kenyon & Kenyon

(57) ABSTRACT

A catalyst warming apparatus for an internal combustion engine provides an appropriate combustible mixture for heating an exhaust-purifying catalyst disposed in an exhaust passage of an internal combustion engine, without providing a special pre-mixing chamber for mixing fuel and air, by burning the combustible mixture in the exhaust passage upstream of the exhaust-purifying catalyst when the exhaust-purifying catalyst is inactive. Specifically, fuel components and air discharged from the internal combustion engine are mixed into a combustible mixture in a sub exhaust-purifying catalyst disposed in the exhaust passage upstream of a main exhaust-purifying catalyst, and the resultant combustible mixture is burned upstream of the main exhaust-purifying catalyst.

8 Claims, 15 Drawing Sheets

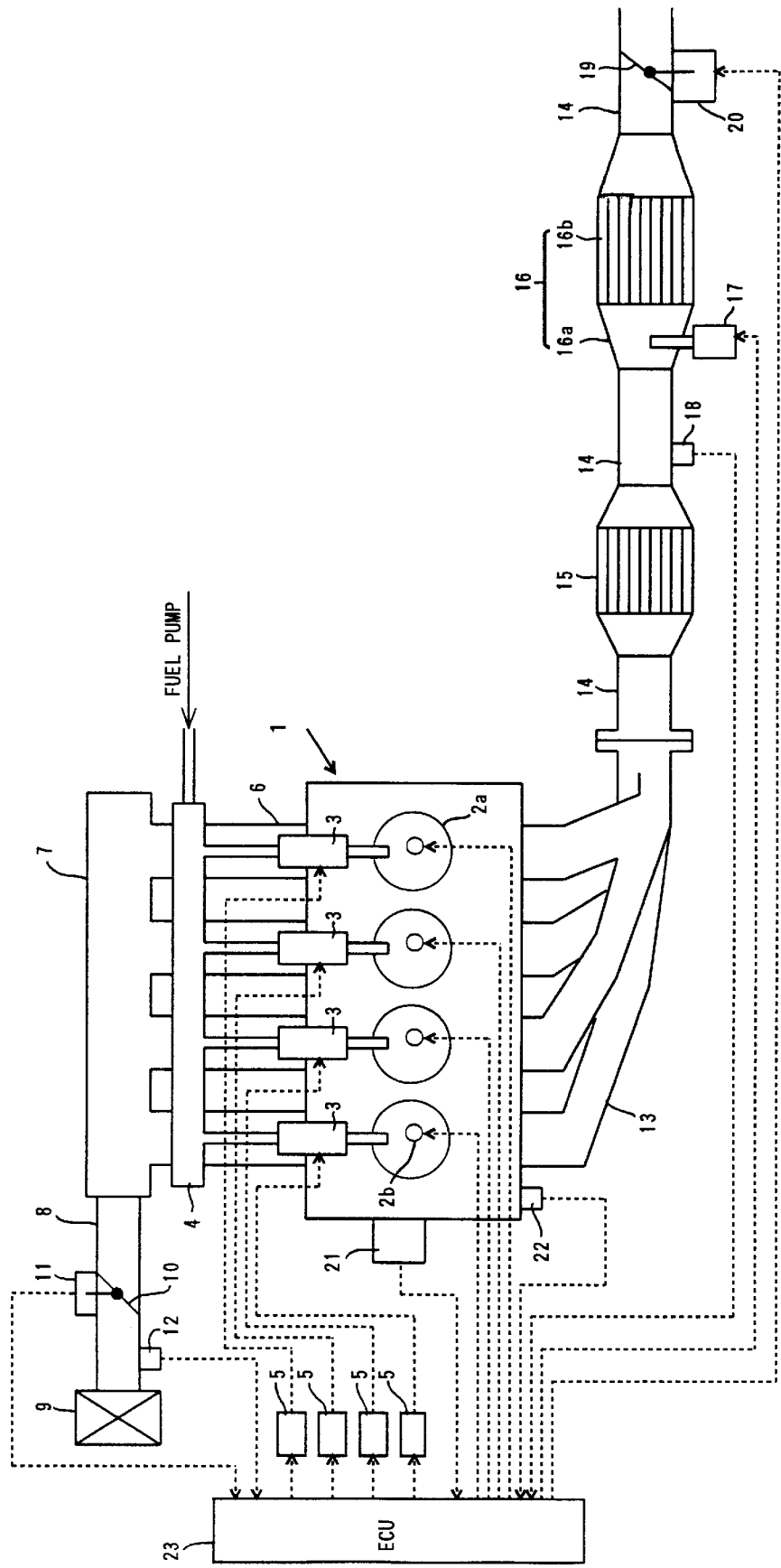
F I G. 1

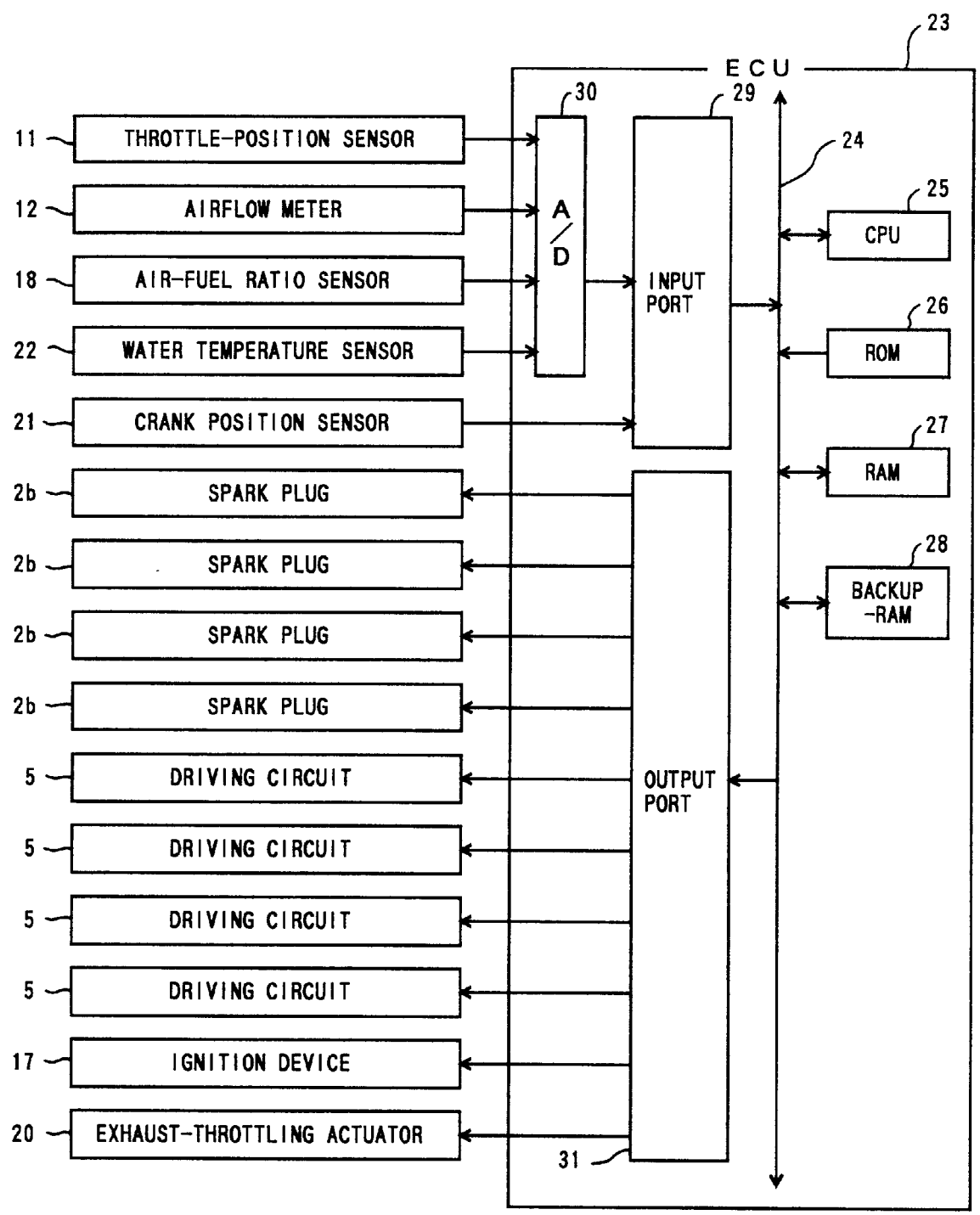
F I G. 4

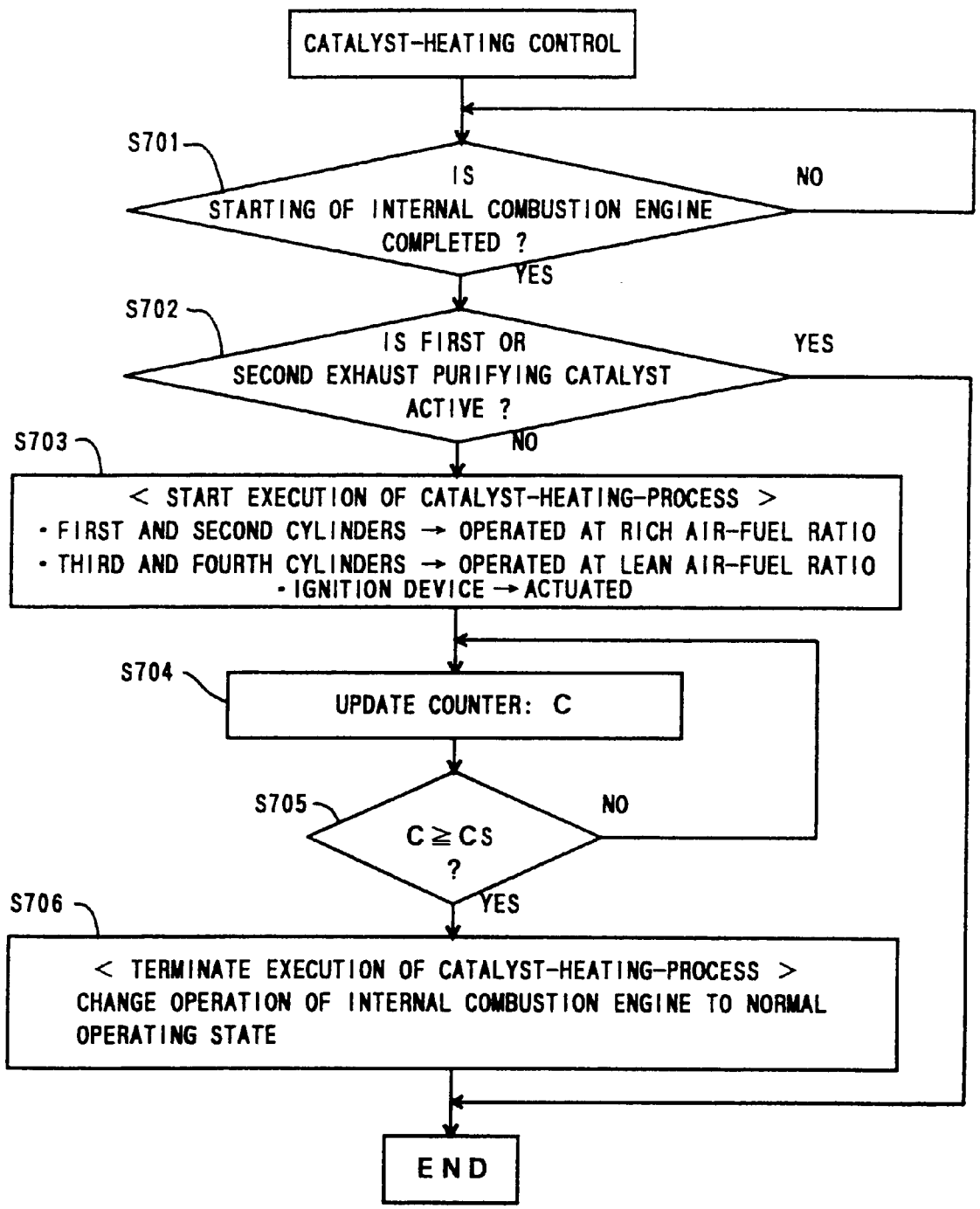
F I G. 7

CATALYST WARMING APPARATUS OF INTERNAL COMBUSTION ENGINE

BACKGROUND ART

The present invention generally relates to a technology for purifying the exhaust gas of internal combustion engines mounted in automobiles and the like, and in particular, relates to a technology for improving exhaust emissions by activating early on an exhaust-purifying catalyst disposed in an exhaust passage of the internal combustion engine.

In recent years, internal combustion engines mounted in automobiles and the like are required to remove harmful gas components contained in the exhaust gas before discharging the exhaust gas into the air. With respect to such requirement, there has been proposed a technology in which an exhaust-purifying catalyst that removes the harmful gas components contained in the exhaust gas is provided in an exhaust passage of an internal combustion engine.

As an exhaust-purifying catalyst described above, a wide variety of exhaust-purifying catalysts have been developed including, for example, a three-way catalyst, an $NO_x$ occlusion reduction catalyst, a selective reduction $NO_x$ catalyst, an oxidation catalyst, and an exhaust-purifying catalyst formed from an appropriate combination of these exhaust-purifying catalysts. These exhaust-purifying catalysts are generally capable of purifying the harmful gas components of the exhaust gas when activated at or higher than a predetermined temperature. Therefore, these exhaust-purifying catalysts cannot sufficiently purify the harmful gas components of the exhaust gas at a temperature less than the predetermined temperature, for example, when the internal combustion engine is cold-started.

Particularly, when the internal combustion engine is cold-started, combustion of the mixture is likely to become unstable due to low temperature within the cylinders. Therefore, the internal combustion engine discharges a relatively large quantity of unburned fuel components. If the exhaust-purifying catalyst is inactive, a large quantity of unburned fuel components is discharged into the air without being purified.

Accordingly, when the internal combustion engine is cold-started, it is important to activate the exhaust-purifying catalyst early on to suppress degradation of the exhaust emissions during and immediately after starting.

Regarding such a requirement, Japanese Patent No. 2710269 discloses a proposal for a catalyst-heating burner for a spark-ignition engine.

This catalyst-heating burner for the spark-ignition engine described in the Patent Publication of the above-mentioned patent includes an exhaust-purifying catalyst disposed in an exhaust passage of the internal combustion engine, and a combustor disposed in the exhaust passage upstream of the exhaust-purifying catalyst. When the internal combustion engine is warmed up after cold starting, half of the cylinders of the internal combustion engine are operated with a rich mixture to produce a combustible gas, and fuel injection to the other half is discontinued. The combustible gas discharged from the former half cylinders and the air discharged from the latter half cylinders are mixed and burned in the combustor, thereby quickly heating the exhaust-purifying catalyst.

The combustor used in such a catalyst-heating burner for the spark-ignition engine has a chamber for mixing and burning the combustible gas and the air. However, this chamber has a larger cross-sectional area as compared to that of the exhaust passage and a larger heat capacity. Therefore, the heat of the exhaust gas would be transferred to the combustor when the combustor is not in operation.

Then, when the heat of the exhaust gas is transferred to the combustor, the exhaust-purifying catalyst located downstream of the combustor is cooled by the low-temperature exhaust gas, resulted in a possibility of lowering the temperature of the exhaust-purifying catalyst to a temperature less than the activation temperature.

Moreover, the combustor of the above-described catalyst-heating burner for the spark ignition engine is located immediately downstream of the exhaust branch pipes. Therefore, the combustible mixture within the combustor is liable to be affected by pulsation of the exhaust gas, whereby combustion of the combustible mixture is liable to become unstable. Moreover, an atmosphere.temperature of the exhaust passage and the combustor becomes low immediately after cold-starting of the internal combustion engine, so that combustion of the combustible mixture is apt to become unstable.

Such unstable combustion of the combustible mixture in the combustor makes it difficult for the combustible mixture to be completely burned up, and, it is possible to result in rather increasing quantity of unburned fuel components to be discharged into the air.

SUMMARY OF THE INVENTION

The present invention has been made in view of the foregoing conventional problems. A first object of the present invention is to prevent an undesirable temperature decrease of an exhaust-purifying catalyst during normal operation and suppress degradation of exhaust emissions, by providing a technology capable of mixing the combustible gas and air, without providing a special combustion chamber dedicated for mixing the combustible gas and air, in an apparatus for warming an exhaust-purifying catalyst by burning the combustible mixture in an exhaust passage upstream of the exhaust-purifying catalyst.

A second object of the present invention is to prevent degradation of exhaust emissions caused by combustion of the combustible mixture and activate an exhaust-purifying catalyst early on, by providing a technology for stabilizing combustion of the combustible mixture in an apparatus for warming an exhaust-purifying catalyst by burning the combustible mixture in an exhaust passage upstream of the exhaust-purifying catalyst.

First, the present invention employs the following means to achieve the foregoing first object.

More specifically, a catalyst warming apparatus of an internal combustion engine according to the present invention includes: an exhaust passage connected to the internal combustion engine; a main exhaust-purifying catalyst provided in the exhaust passage for purifying exhaust gas flowing in the exhaust passage; a sub exhaust-purifying catalyst provided in the exhaust passage upstream of the main exhaust-purifying catalyst for purifying the exhaust gas flowing in the exhaust passage; ignition means provided in the exhaust passage between the main and sub exhaust-purifying catalysts; and combustible-component supply means for supplying fuel and air to the exhaust passage upstream of the sub exhaust-purifying catalyst.

In a catalyst warming apparatus constructed as described above, the combustible-component supply means and the ignition means are actuated when the main exhaust-purifying catalyst needs to be heated.

When the combustible-component supply means is actuated, fuel and air are supplied to the exhaust passage upstream of the sub exhaust-purifying catalyst and enter the sub exhaust-purifying catalyst.

The sub exhaust-purifying catalyst has a plurality of flow passages each having a much smaller diameter as compared to that of the exhaust passage. Therefore, the fuel and air flowing in such small flow passages are sufficiently mixed together. As a result, the gas flowing out from the sub exhaust-purifying catalyst is a combustible gas consisting of a pre-mixed fuel and air, namely, a combustible mixture.

The combustible mixture discharged from the sub exhaust-purifying catalyst is ignited for combustion by the ignition means disposed in the exhaust passage between the sub and main exhaust-purifying catalysts. Hot burned gas produced by the combustion of the combustible mixture enters the main exhaust-purifying catalyst located downstream of the ignition means. When the burned gas flows through the main exhaust-purifying catalyst, a large amount of heat is transferred from the burned gas to the main exhaust-purifying catalyst, whereby the main exhaust-purifying catalyst is rapidly warmed up to an activation temperature range.

Therefore, according to the catalyst warming apparatus of the internal combustion engine according to the present invention, the fuel and air are mixed in the sub exhaust-purifying catalyst. This obviates the need for providing a special pre-mixing chamber for mixing the fuel and air. As a result, when the internal combustion engine is in the normal operating state, the heat of the exhaust gas is not transferred to such pre-mixing chamber, so that the main exhaust-purifying catalyst is not undesirably cooled by the low-temperature exhaust gas.

In the catalyst warming apparatus according to the present invention, the combustible-component supply means may supply the fuel and air to the exhaust passage upstream of the sub exhaust-purifying catalyst immediately before completion of starting of the internal combustion engine.

In this case, the main exhaust-purifying catalyst is warmed up to the activation temperature range before the internal combustion engine starts combustion of the mixture, in other words, before the internal combustion engine discharges the burned mixture as exhaust gas. Therefore, harmful gas components in the exhaust gas could have been purified in the main exhaust-purifying catalyst at the time when the internal combustion engine, after completion of starting operation, starts discharging the burned mixture as exhaust gas.

For supplying the fuel and air to the exhaust passage upstream of the sub exhaust-purifying catalyst immediately before completion of starting the internal combustion engine, the combustible-component supply means may be adapted to supply the fuel and air to the exhaust passage upstream of the sub exhaust-purifying catalyst by allowing actuation of a fuel injection valve in every cylinder of the internal combustion engine, and, at the same time, inhibiting actuation of a spark plug in every cylinder, during cranking of the internal combustion engine so that every cylinder discharges an unburned mixture.

For supplying the fuel and air to the exhaust passage upstream of the sub exhaust-purifying catalyst immediately before completion of starting the internal combustion engine, the combustible-component supply means may be adapted to supply the fuel and air to the exhaust passage upstream of the sub exhaust-purifying catalyst by inhibiting actuation of the spark plug in every cylinder of the internal combustion engine, and, at the same time, allowing actuation of the fuel injection valve in one or more of the cylinders, during cranking of the internal combustion engine so that the aforementioned one or more cylinders discharge unburned mixture.

For supplying the fuel and air to the exhaust passage upstream of the sub exhaust-purifying catalyst immediately before completion of starting the internal combustion engine, the combustible-component supply means may be adapted to supply the fuel and air to the exhaust passage upstream of the sub exhaust purifying catalyst, by allowing actuation of the fuel injection valve in every cylinder of the internal combustion engine, and, at the same time, inhibiting actuation of the spark plug in one or more of the cylinders, during cranking of the internal combustion engine so that the aforementioned one or more cylinders discharge unburned mixture.

Meanwhile, in the catalyst warming apparatus of the internal combustion engine according to the present invention, the combustible-component supply means may be adapted to supply the fuel and air to the exhaust passage upstream of the sub exhaust-purifying catalyst immediately after completion of starting of the internal combustion engine.

In this case, the combustible mixture is burned in the exhaust passage upstream of the main exhaust-purifying catalyst immediately after starting of the internal combustion engine, and because of this the main exhaust-purifying catalyst is rapidly warmed up to the activation temperature range.

As a result, degradation of exhaust emissions immediately after starting of the internal combustion engine can be suppressed even when the internal combustion engine is started with the main exhaust-purifying catalyst being in the inactive state.

For supplying the fuel and air to the exhaust passage upstream of the sub exhaust-purifying catalyst immediately before completion of starting the internal combustion-engine, the combustible-component supply means may be adapted to supply the fuel and air to the exhaust passage upstream of the sub exhaust-purifying catalyst by causing one or more of the cylinders of the internal combustion engine to discharge exhaust gas containing unburned fuel as well as causing the remainder of the cylinders to discharge exhaust gas containing unburned air, immediately after completion of starting of the internal combustion engine.

The combustible-component supply means may be adapted to cause one or more of the cylinders of the internal combustion engine to discharge the exhaust gas containing unburned fuel, by burning a rich mixture in the aforementioned one or more cylinders so that the unburned fuel remains in the exhaust gas discharged from the aforementioned one or more cylinders.

The combustible-component supply means may be adapted to cause the aforementioned one or more cylinders of the internal combustion engine to discharge the exhaust gas containing unburned fuel, by injecting main fuel for combustion from the fuel injection valve of the aforementioned one or more cylinders, and then, secondarily injecting fuel therefrom so that the unburned fuel is contained in the exhaust gas discharged from the aforementioned one or more cylinders. The time for secondarily injecting fuel may be the latter half of the expansion stroke of the aforementioned one or more cylinders or during the exhaust stroke thereof, after finishing combustion of the main fuel.

The combustible-component supply means may be adapted to cause one or more of the cylinders of the internal combustion engine to discharge the exhaust gas containing unburned fuel, by causing low-temperature combustion to occur in the aforementioned one or more cylinders. In this case, the fuel injected from the fuel injection valve(s) is not completely burned in the cylinder(s) of low-temperature combustion, whereby a relatively large quantity of unburned fuel remains in the exhaust gas discharged from the cylinder (s).

Here, the method of performing the low-temperature combustion may be exemplified by a method called an exhaust gas recirculation (EGR) for recirculating some of the exhaust gas flowing in the exhaust system of the internal combustion engine into the intake system thereof.

The combustible-component supply means may be adapted to cause the other cylinder(s) of the internal combustion engine to discharge the exhaust gas containing unburned air, by burning a lean mixture in the aforementioned other cylinder(s).

The combustible-component supply means may be adapted to cause the other cylinder(s) of the internal combustion engine to discharge the exhaust gas containing unburned air, by inhibiting actuation of the fuel injection valve(s) of the aforementioned other cylinder(s).

The combustible-component supply means may be adapted to supply the fuel and air to the exhaust passage upstream of the sub exhaust-purifying catalyst by burning a rich mixture in every cylinder of the internal combustion engine, and, at the same time, supplying sub air to the exhaust passage upstream of the sub exhaust-purifying catalyst, immediately after completion of starting of the internal combustion engine. Note that the expression "the exhaust passage upstream of the sub exhaust-purifying catalyst" as used herein refers to the passage from the combustion chambers of the internal combustion engine to the sub exhaust-purifying catalyst, and for example, includes an exhaust passage connected to exhaust ports formed in the internal combustion engine or the exhaust passage connected to the internal combustion engine.

The catalyst warming apparatus of the internal combustion engine according to the present invention may further include flame back-flow preventing means for preventing flame of the combustible mixture ignited by the ignition means from flowing backward in the exhaust passage.

In this case, since the flame of the combustible mixture ignited by the ignition means does not flow backward in the exhaust passage, the flame is stabilized, and the main exhaust-purifying catalyst can be reliably heated.

Here, the flame back-flow preventing means may be a wire mesh having a multiplicity of holes of a diameter equal to or smaller than a flame-quenching diameter. However, it is preferable to make the diameter of the exhaust passage in the sub exhaust-purifying catalyst equal to or smaller than the flame-quenching diameter so as to add the function of the flame back-flow preventing means to the sub exhaust-purifying catalyst.

In the catalyst warming apparatus of the internal combustion engine according to the present invention, the main exhaust-purifying catalyst may be a so-called wall-flow catalyst that includes a porous base material including a flow passage having its upstream end open and downstream end closed, and a flow passage having its upstream end closed and downstream end open, wherein the former flow passage and the latter flow passage are alternately arranged in a honeycomb pattern.

Thus, any soot or the like produced by the combustion of the combustible mixture is removed by the main exhaust-purifying catalyst, whereby degradation of exhaust emissions due to the combustion of the combustible mixture is prevented.

In the catalyst warming apparatus of the internal combustion engine according to the present invention, the ignition means may be disposed so that the flame resulting from ignition of the combustible mixture is produced in a portion upstream of a catalyst carrier within the main exhaust-purifying catalyst. Preferably, the portion upstream of the catalyst carrier within the main exhaust-purifying catalyst has a heat insulated structure.

According to such a catalyst warming apparatus of the internal combustion engine having the. above-described structure, the combustible mixture is burned in the portion upstream of the catalyst carrier within the main exhaust-purifying catalyst. This obviates the need for a special combustion chamber for burning the combustible chamber. As a result, the heat of the exhaust gas is not transferred to the combustion chamber when the internal combustion engine is in the normal operating state.

The catalyst warming apparatus of the internal combustion engine according to the present invention may further include air supply means for supplying only the air to the exhaust passage upstream of the sub exhaust-purifying catalyst for a predetermined period after completion of heating the main exhaust-purifying catalyst.

In this case, only the air is supplied to the exhaust passage upstream of the sub exhaust-purifying catalyst for the predetermined period after completion of heating the main exhaust-purifying catalyst. Therefore, the combustible mixture remaining in the exhaust passage from the sub exhaust-purifying catalyst to the ignition means is completely removed. As a result, combustion of the combustible mixture does not occur in the exhaust passage after completion of heating the main exhaust-purifying catalyst.

Note that, when the catalyst warming apparatus of the internal combustion engine according to the present invention is structured so as to heat the main exhaust-purifying catalyst before starting the internal combustion engine, the catalyst warming apparatus preferably further includes: air supply means for supplying only air to the exhaust passage upstream of the sub exhaust-purifying catalyst for a predetermined period after the main exhaust-purifying catalyst is warmed up to a desired temperature range; and engine starting means for starting the internal combustion engine after a lapse of the predetermined period.

The present invention employs the following means to achieve the foregoing second object.

More specifically, the catalyst warming apparatus of the internal combustion engine according to the present invention further includes: exhaust throttling means for throttling a flow rate of the exhaust gas flowing in the exhaust passage when the combustible-component supply means is supplying the fuel and air to the exhaust passage upstream of the sub exhaust-purifying catalyst, in addition to the exhaust passage connected to the internal combustion engine; a main exhaust-purifying catalyst provided in the exhaust passage for purifying the exhaust gas flowing in the exhaust passage; a sub exhaust-purifying catalyst provided in the exhaust passage upstream of the main exhaust-purifying catalyst for purifying the exhaust gas flowing in the exhaust passage; ignition means provided in the exhaust passage between the main and sub exhaust-purifying catalysts; and combustible-component supply means for supplying fuel and air to the exhaust passage upstream of the sub exhaust-purifying catalyst.

In such a catalyst warming apparatus of an internal combustion engine structured as described above, when the main exhaust-purifying catalyst needs to be heated, the combustible-component supply means and the ignition means are actuated and the exhaust throttling means throttles the flow rate in the exhaust passage.

In this case, since the exhaust throttling means throttles the flow rate in the exhaust passage, pressure in the exhaust passage from the internal combustion engine to the exhaust throttling means is increased, whereby pulsation of the exhaust gas discharged from the internal combustion engine is suppressed.

As a result, ignitability of the combustible mixture is improved and combustion of the combustible mixture is stabilized, thereby enabling the exhaust-purifying catalyst to be reliably heated.

Note that, in the catalyst warming apparatus of the internal combustion engine according to the present invention, the exhaust throttling means may be provided in the exhaust passage down-stream of the ignition means, and preferably, provided in the exhaust passage downstream of the main exhaust-purifying catalyst.

In this case, when the exhaust throttling means throttles the flow rate of the exhaust gas in the exhaust passage, the pressure in the exhaust passage is increased, whereby pulsation of the exhaust gas is suppressed. Moreover, an atmospheric temperature in the vicinity of the ignition means is raised, whereby ignitability of the combustible mixture is improved.

When the exhaust throttling means is disposed in the exhaust passage downstream of the main exhaust-purifying catalyst, burned gas of the combustible mixture flows through the main exhaust-purifying catalyst at a low velocity due to the throttled flow rate of the exhaust gas in the exhaust passage by the exhaust throttling means. Therefore, the heat of the burned gas is efficiently transferred to the main exhaust-purifying catalyst.

BRIEF DESCRIPTION OF THE DRAWINGS

FIG. 1 is a diagram showing a schematic structure of an internal combustion engine to which a catalyst warming apparatus according to the present invention is applied;

FIG. 4 is a block diagram showing an internal structure of an electronic control unit (ECU);

FIG. 7 is a flowchart illustrating a catalyst-heating control routine according to Embodiment 3;

DESCRIPTION OF THE PREFERRED EMBODIMENTS

Figure 2:
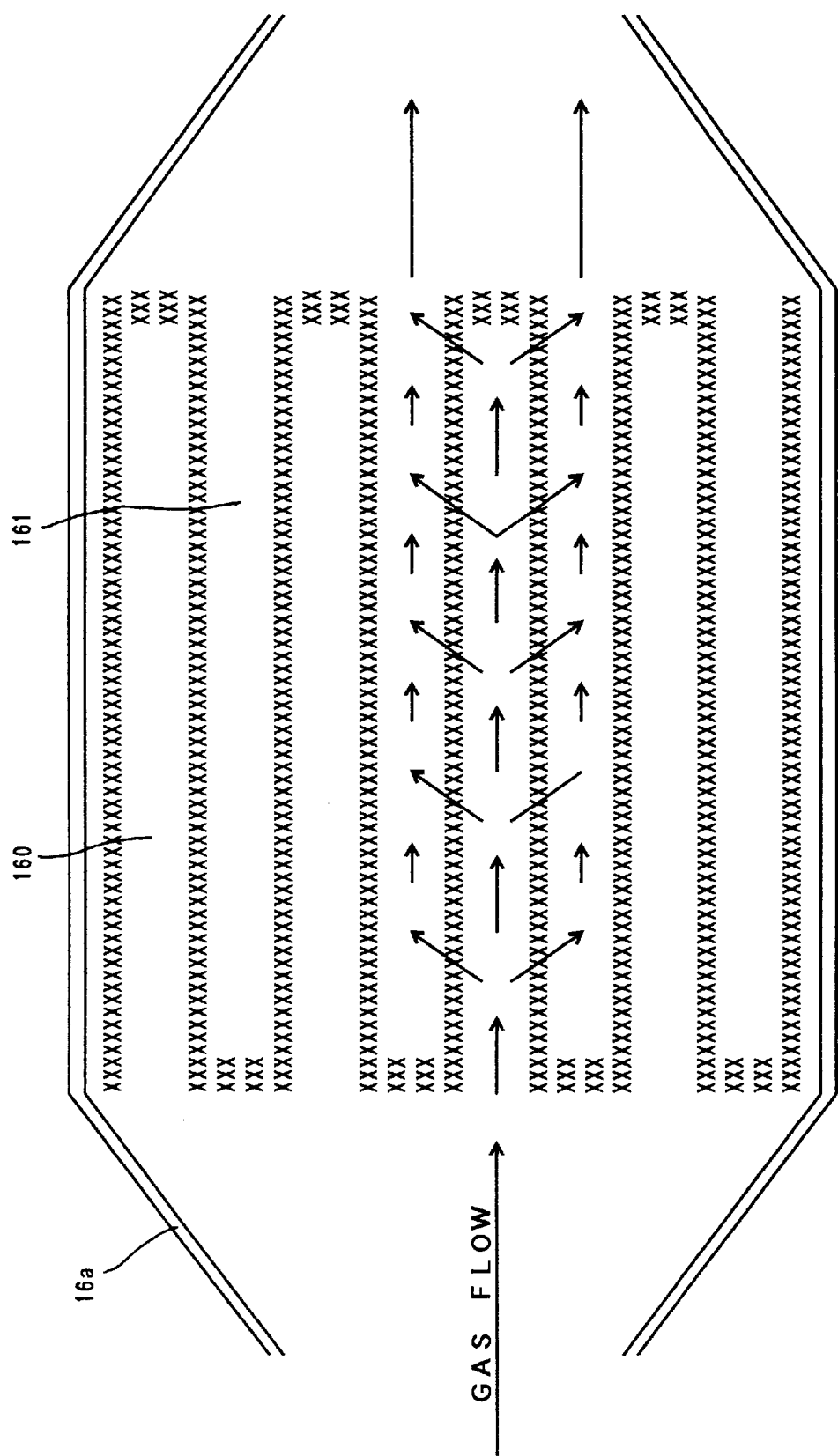
FIG. 2 is a first diagram illustrating an internal structure of a second exhaust-purifying catalyst.

Hereinafter, specific embodiments of a catalyst warming apparatus of an internal combustion engine according to the present invention will be described referring to the accompanying drawings.

Embodiment 1

First, a catalyst warming apparatus of an internal combustion engine according to Embodiment 1 of the present invention will be described with reference to FIGS. 1 to 5.

FIG. 1 is a diagram showing a schematic structure of the internal combustion engine to which the catalyst warming apparatus of the present embodiment is applied, and intake and exhaust systems thereof.

The internal combustion engine 1 of FIG. 1 is a four-cycle, water-cooled gasoline engine having four cylinders 2a. The internal combustion engine 1 is provided with spark plugs 2b that face respective combustion chambers of the cylinders 2a. The internal combustion engine 1 is also provided with fuel injection valves 3 having their injection ports facing the respective combustion chambers of the cylinders 2a.

Each fuel injection valve 3 communicates with a fuel distribution pipe 4, which in turn communicates with an unillustrated fuel pump. The fuel distribution pipe 4 receives the fuel discharged from the fuel pump, and distributes the received fuel to each fuel injection valve 3.

The fuel injection valves 3 are connected to respective driving circuits 5 through electrical wiring, so that each fuel injection valve 3 is opened to inject the fuel in response to an electric driving power applied thereto from the associated driving circuit 5.

Inlet branch pipes 6 are connected to the internal combustion engine 1 so as to communicate with the respective combustion chambers of the cylinders 2a through unillustrated respective inlet ports.

The inlet branch pipes 6 are connected to a surge tank 7, which in turn is connected to an air cleaner box 9 through an inlet pipe 8.

The inlet pipe 8 is provided with a throttle valve 10 cooperating with an unillustrated accelerator pedal for adjusting the flow rate of the intake air flowing in the inlet pipe 8. The throttle valve 10 is provided with a throttle-position sensor 11 for outputting an electric signal corresponding to a degree of opening of the throttle valve 10.

An airflow meter 12 for outputting an electric signal corresponding to the mass of the intake air flowing in the inlet pipe 8 is provided in the inlet pipe 8 upstream of the throttle valve 10.

Exhaust branch pipes 13 are connected to the internal combustion engine 1 so as to communicate with the respective combustion chambers of the cylinders 2a through unillustrated respective exhaust ports. The exhaust branch pipes 13 are connected to an exhaust pipe 14, which in turn is connected to an unillustrated muffler in the downstream of the exhaust pipe 14.

The exhaust pipe 14 is provided with a first exhaust-purifying catalyst 15 for purifying harmful gas components contained in the exhaust gas flowing in the exhaust pipe 14. The first exhaust-purifying catalyst 15 is one embodiment of a sub exhaust-purifying catalyst according to the present invention. For example, the first exhaust-purifying catalyst 15 is a three-way catalyst that includes a lattice-like ceramic carrier of cordierite having a plurality of through holes extending along a exhaust gas flowing direction, and a catalytic layer that is coated over the surface of the ceramic carrier. The catalytic layer is formed from a platinum-rhodium (Pt—Rh)-based or palladium-rhodium (Pd—Rh)-based precious metal catalytic substance carried on the surface of porous alumina (Al) having a multiplicity of pores.

The first exhaust-purifying catalyst 15 as structured above is activated at a temperature equal to or above a predetermined temperature. When the exhaust gas, having an air-fuel ratio close to a desirable ratio, is introduced into the first exhaust-purifying catalyst 15, the first exhaust-purifying catalyst 15 reacts hydrocarbon (HC) and carbon monoxide (CO) contained in the exhaust gas with oxygen ($O_2$) therein, thereby oxidizing HC and CO into water ($H_2O$) and carbon dioxide ($CO_2$). At the same time, the first exhaust-purifying catalyst 15 reacts nitrogen oxide ($NO_x$) in the exhaust gas with HC and CO therein, thereby reducing $NO_x$ to water ($H_2O$), carbon dioxide ($CO_2$) and nitrogen ($N_2$).

The exhaust pipe 14 is provided with a second exhaust-purifying catalyst 16 downstream of the first exhaust-purifying catalyst 15. The second exhaust-purifying catalyst 16 is one embodiment of a main exhaust-purifying catalyst according to the present invention, and includes a casing 16a formed by a cylindrical body having tapered cone portions at both ends, and a catalyst body 16b disposed within the cylindrical body of the casing 16a.

Figure 3:
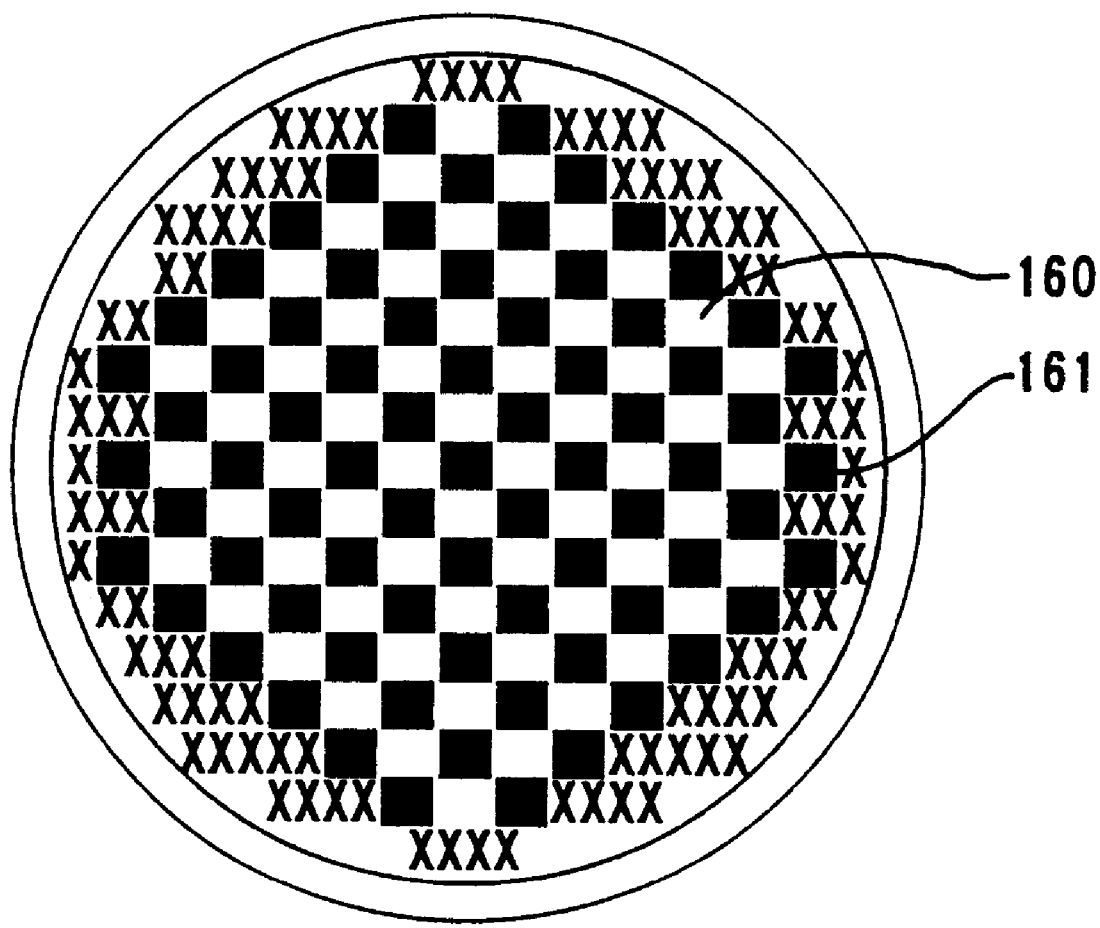
FIG. 3 is a second diagram illustrating the internal structure of the second exhaust-purifying catalyst.

As shown in FIGS. 2 and 3, the catalyst body 16b is a wall-flow exhaust-purifying catalyst that is formed by a porous carrier and a catalytic layer formed on the surface of the porous carrier. The porous carrier includes first and second flow passages 160, 161, respectively, that are arranged in a honeycomb pattern. The first flow passage 160 has its upstream end opened and downstream end closed, whereas the second flow passage 161 has its upstream end closed and downstream end opened.

The above-described carrier may include, for example, porous ceramics and zeolite, and the catalytic layer may include a catalytic layer formed from a platinum-rhodium (Pt—Rh)-based or palladium-rhodium (Pd—Rh)-based precious metal catalytic substance carried on the surface of porous alumina (Al), or a catalytic layer formed from (i) at least one element selected from a group consisting of an alkali metal, such as potassium (K), sodium (Na), lithium (Li) or cesium (Cs), an alkaline earth metal, such as barium (Ba) or calcium (Ca), and a rare earth element, such as lanthanum (La) or yttrium (Y), and (ii) a precious metal such as platinum (Pt).

In the second exhaust-purifying catalyst 16 structured as described above, the exhaust gas entering the second exhaust-purifying catalyst 16 is first introduced into the first flow passages 160, and then, through pores formed in the wall of the carrier into the second flow passages 161. Thereafter, the exhaust gas is discharged from the second flow passages 161 into the downstream exhaust pipe 14.

While the exhaust gas is flowing through the pores in the wall of the carrier, the carrier collects particulate matter such as soot and unburned fuel components contained in the exhaust gas, and the catalytic layer on the surface of the carrier purifies harmful gas components contained in the exhaust gas.

Referring back to FIG. 1, the cone portion located upstream of the catalyst body 16b in the casing 16a of the second exhaust-purifying catalyst 16 is provided with an ignition device 17 formed by a piezoelectric element. This ignition device 17 implements ignition means according to the present invention.

This cone portion of the casing 16a is preferably formed of a heat insulated structure. A method of forming the cone portion with the heat insulated structure may include, for example, applying a ceramic coating over the inner wall surface of the cone portion, forming the outer wall of the cone portion to have a double structure and providing a vacuum layer between the wall surfaces of the double structure, and other methods may be used to provide the heat insulated structure of the cone portion.

The exhaust pipe 14 is provided with an air-fuel ratio sensor 18 between the first exhaust-purifying catalyst 15 and the second exhaust-purifying catalyst 16. The air-fuel ratio sensor 18 outputs an electric signal corresponding to the air-fuel ratio of the exhaust gas flowing in the exhaust pipe 14, i.e., the air-fuel ratio of the exhaust gas entering the second exhaust-purifying catalyst 16.

The air-fuel ratio sensor 18 is formed by, for example, a solid electrolyte portion formed from zirconia ($ZrO_2$) baked into a cylindrical shape, an outer platinum electrode covering the outer surface of the solid electrolyte portion, and an inner platinum electrode covering the inner surface of the solid electrolyte portion. When a voltage is applied between the electrodes, the air-fuel ratio sensor 18 outputs a voltage value proportional to the oxygen concentration in the exhaust gas (concentration of unburned gas components when the air-fuel ratio is richer than the theoretical air-fuel ratio) resulting from migration of oxygen ions.

The exhaust pipe 14 is provided with an exhaust throttle valve 19 downstream of the second exhaust-purifying catalyst 16. The exhaust throttle valve 19 adjusts the flow rate of the exhaust gas flowing in the exhaust pipe 14. The exhaust throttle valve 19 is provided with an exhaust-throttling actuator 20 formed by a stepper motor and the like for opening and closing the exhaust throttle valve 19 according to the magnitude of applied electric power.

The internal combustion engine 1 is provided with a crank-position sensor 21 for outputting a pulse signal every time a crankshaft (not shown) is rotated a predetermined angle (e.g., 10 degrees). The crank-position sensor 21 is formed by a timing rotor mounted to the end of the crankshaft, and an electromagnetic pickup attached to a cylinder block of the internal combustion engine 1.

The internal combustion engine 1 is also provided with a water-temperature sensor 22 for outputting an electric signal corresponding to the temperature of cooling water flowing in a water jacket formed in the cylinder block and cylinder head of the internal combustion engine 1.

The internal combustion engine 1 structured as described above further includes an electronic control unit (ECU) 23 for controlling the internal combustion engine 1. Various sensors such as the throttle-position sensor 11, the airflow meter 12, the air-fuel ratio sensor 18, the crank-position sensor 21, and the water-temperature sensor 22 are connected to the ECU 23 through electrical wiring, so that the output signals of the sensors are input to the ECU 23.

Further, the spark plugs 2b, driving circuits 5, ignition device 17, and exhaust-throttling actuator 20 are connected to the ECU 23 through electrical wiring, so that the ECU 23 can control them by using the output signal values of the sensors as parameters.

As shown in FIG. 4, the ECU 23 includes a central processing unit (CPU) 25, a read only memory (ROM) 26, a random access memory (RAM) 27, a backup RAM 28, an input port 29, and an output port 31, which are connected to each other through a bi-directional bus 24. The ECU 23 further includes an analog/digital (A/D) converter (A/D) 30 connected to the input port 29.

The input port 29 receives an output signal from a sensor that outputs a signal in digital form, such as the crank-position sensor 21, and transmits the signal to the CPU 25 and/or the RAM 27.

Further, the input port 29 receives, through the A/D converter 30, output signals from sensors that outputs signals in analog form, such as the throttle-position sensor 11, the airflow meter 12, the air-fuel ratio sensor 18 and the water-temperature sensor 22, and transmits the signals to the CPU 25 and/or the RAM 27.

The output port 31 is connected to the spark plugs 2b, the driving circuits 5, the ignition device 17 and the exhaust-throttling actuator 20 through electrical wiring so as to transmit a control signal outputted from the CPU 25 to the spark plugs 2b, the driving circuits 5, the ignition device 17 or the exhaust-throttling actuator 20.

The ROM 26 stores various application programs such as an ignition-timing control routine for determining the ignition timing of each spark plug 2b, a fuel injection volume control routine for determining the fuel quantity to be injected from each fuel injection valve 3, an air-fuel ratio feedback control routine for performing air-fuel ratio feedback-controlling of the fuel injection volume, a fuel injection timing control routine for determining the fuel injection timing of each fuel injection valve 3, and an exhaust-throttling control routine for deter-mining the opening degree of the exhaust throttle valve 19, and in addition, the ROM 26 stores a catalyst-heating control routine for heating the second exhaust-purifying catalyst 16.

In addition to these application programs, the ROM 26 further stores various control maps. The control maps include, for example, an ignition-timing control map indicating the relation between the operating state of the internal combustion engine 1 and the ignition timing, a fuel injection volume control map indicating the relation between the operating state of the internal combustion engine 1 and the fuel injection volume, a fuel injection timing control map indicating the relation between the operating state of the internal combustion engine 1 and the fuel injection timing, and an exhaust-throttle-valve-opening control map indicating the relation between the operating state of the internal combustion engine 1 and the opening degree of the exhaust throttle valve 19.

The RAM 27 stores the output signals from the sensors, calculation results of the CPU 25, and the like. The calculation results include, for example, an engine speed calculated from the output signal of the crank-position sensor 21. The data is updated every time the crank-position sensor 21 outputs a signal.

The backup RAM 28 is a non-volatile memory capable of storing data even after the internal combustion engine 1 is stopped, and it stores a learning value relating to the ignition control, a learning value relating to the fuel-injection control, a learning value relating to the exhaust-throttling control and the like.

The CPU 25 operates according to the application programs stored in the ROM 26. The CPU 25 determines the operating state of the internal combustion engine 1 from the output signals of the sensors stored in the RAM 27. Based on the determined operating state and the control maps, the CPU 25 executes controls such as ignition control and fuel-injection control, and also executes the catalyst-heating control that is the subject matter of the present invention.

The catalyst-heating control is the control for activating the catalyst body 16b of the second exhaust-purifying catalyst 16 early on, and this control is executed when the internal combustion engine 1 is started with the first and second exhaust-purifying catalysts 15, 16 being inactive, such as when the internal combustion engine 1 is cold-started.

In the catalyst-heating control, the CPU 25 first determines whether at least one of the first and second exhaust-purifying catalysts 15, 16 is active or not when the internal combustion engine 1 is started.

When the CPU 25 determines that both the first and second exhaust-purifying catalysts 15, 16 are inactive, the CPU 25 executes a catalyst-heating process in order to activate the second exhaust-purifying catalyst 16 early on. When the CPU 25 determines that at least one of the first and second exhaust-purifying catalysts 15, 16 is active, and preferably, if the CPU 25 determines that the second exhaust-purifying catalysts 16 is active, the CPU 25 does not execute the catalyst-heating process.

In the catalyst-heating process, the CPU 25 first inhibits application of the driving electric power to the spark plugs 2b, and actuates the unillustrated starter motor, and at the same time, the CPU 25 applies the driving electric power to the driving circuits 5 to actuate the fuel injection valves 3. Then, the CPU 25 applies the driving electric power to the ignition device 17.

In this case, each cylinder 2a of the internal combustion engine 1 is supplied with air and fuel. However, since the spark plugs 2b are not actuated, each cylinder 2a discharges the air and fuel still in the unburned state.

The air and fuel discharged from each cylinder 2a flow into the first exhaust-purifying catalyst 15 through the exhaust branch pipes 13 and the exhaust pipe 14. Since the exhaust passage in the first exhaust-purifying catalyst 15 has an extremely smaller diameter as compared to that of the exhaust pipe 14, the air and fuel are mixed together while they are flowing through the exhaust passage of such smaller diameter. As a result, when the air and fuel leave the first exhaust-purifying catalyst 15, they becomes a well-mixed, excellent combustible mixture.

The combustible mixture flowing out of the first exhaust-purifying catalyst 15 reaches the second exhaust-purifying catalyst 16 through the exhaust pipe 14. The combustible mixture reaches and enters the second exhaust-purifying catalyst 16 is ignited and burned by the ignition device 17 provided at the cone portion upstream of the catalyst body 16b in the casing 16a of the second exhaust-purifying catalyst 16. Since the ignition device 17 is located immediately upstream of the catalyst body 16b, the flame of the combustible mixture rapidly heats the catalyst body 16b.

Moreover, the second exhaust-purifying catalyst 16 of the present embodiment is a wall-flow exhaust-purifying catalyst. Therefore, any soot or the like produced by such combustion of the combustible mixture would be captured by the second exhaust-purifying catalyst 16, and therefore, would not be discharged into the air.

Note that, in the present embodiment, in preparation for occurrence of back-flow of the flame generated by the combustion of the combustible mixture toward upstream of the ignition device 17, the exhaust flow passage in the first exhaust-purifying catalyst 15 is formed to have a diameter smaller than a flame-quenching diameter. As a result, the flame generated by the combustion of the combustible mixture does not back-flow toward upstream of the first exhaust-purifying catalyst 15, whereby combustion of the combustible mixture is stabilized.

Additionally, in the catalyst-heating process of the present embodiment, the CPU 25 also closes the exhaust throttle valve 19 to a predetermined degree. As a result, a pressure within the exhaust passage from the internal combustion engine 1 to the exhaust throttle valve 19 is increased. Then, pulsation of the exhaust gas is suppressed by the increased pressure and the temperature within the exhaust passage is increased. Thus, the ignitability and combustion stability of the combustible mixture are improved.

The above-described catalyst-heating process is continued for a predetermined time. The predetermined time is a time period required for raising the temperature of the catalyst body 16b to the activation temperature by the catalyst-heating process, and the time period is experimentally obtained in advance.

Note that the predetermined time may be either a fixed time value or a variable time value that is varied according to a catalyst-bed temperature of the catalyst body 16b upon starting of the internal combustion engine 1.

After continuing execution of the catalyst-heating process for the predetermined time, the CPU 25 executes a combustible-mixture removing process for a predetermined time to completely remove the combustible mixture remaining in the exhaust passage from the internal combustion engine 1 to the ignition device 17.

In the combustible-mixture removing process, the CPU 25 performs, for example, inhibition of application of the driving electric power to the spark plugs 2b, and further, inhibition of application of the driving electric power to the driving circuits 5, and controlling of the exhaust-throttling actuator 20 so as to fully open the exhaust throttle valve 19.

In this case, each cylinder 2a of the internal combustion engine 1 is supplied only with air and therefore, each cylinder 2a discharges that air. The air discharged from each cylinder 2a sequentially flows through the exhaust branch pipes 13, the exhaust pipe 14, the first exhaust-purifying catalyst 15, the exhaust pipe 14, the second exhaust-purifying catalyst 16, and the exhaust pipe 14.

At this time, since the exhaust throttle valve 19 is fully opened, the air discharged from each cylinder 2a rushes into and flows through the exhaust branch pipes 13, the exhaust pipe 14, the first exhaust-purifying catalyst 15, the exhaust pipe 14, the second exhaust-purifying catalyst 16, and the exhaust pipe 14.

As a result, the combustible mixture that remains in the exhaust passage extending from the internal combustion engine 1 to the second exhaust-purifying catalyst 16 (i.e., in the exhaust branch pipes 13, the exhaust pipe 14, the first exhaust-purifying catalyst 15, and the exhaust pipe 14) is forced into the second exhaust-purifying catalyst 16 by the air flowing through the exhaust passage. Thus, the combustible mixture is purified in the catalyst body 16b activated by the catalyst-heating process.

After executing the combustible-mixture removing process for the predetermined time, the CPU 25 starts application of the driving electric power to the spark plugs 2b and the driving circuits 5, and starts the internal combustion engine 1. Since the combustible mixture remaining in the exhaust passage extending from the internal combustion engine 1 to the second exhaust-purifying catalyst 16 has been completely removed, no flame is generated in a broad range covering from the cylinders 2a of the internal combustion engine 1 to the second exhaust-purifying catalyst 16.

Hereinafter, the catalyst-heating control of the present embodiment will be described in detail.

Figure 5:
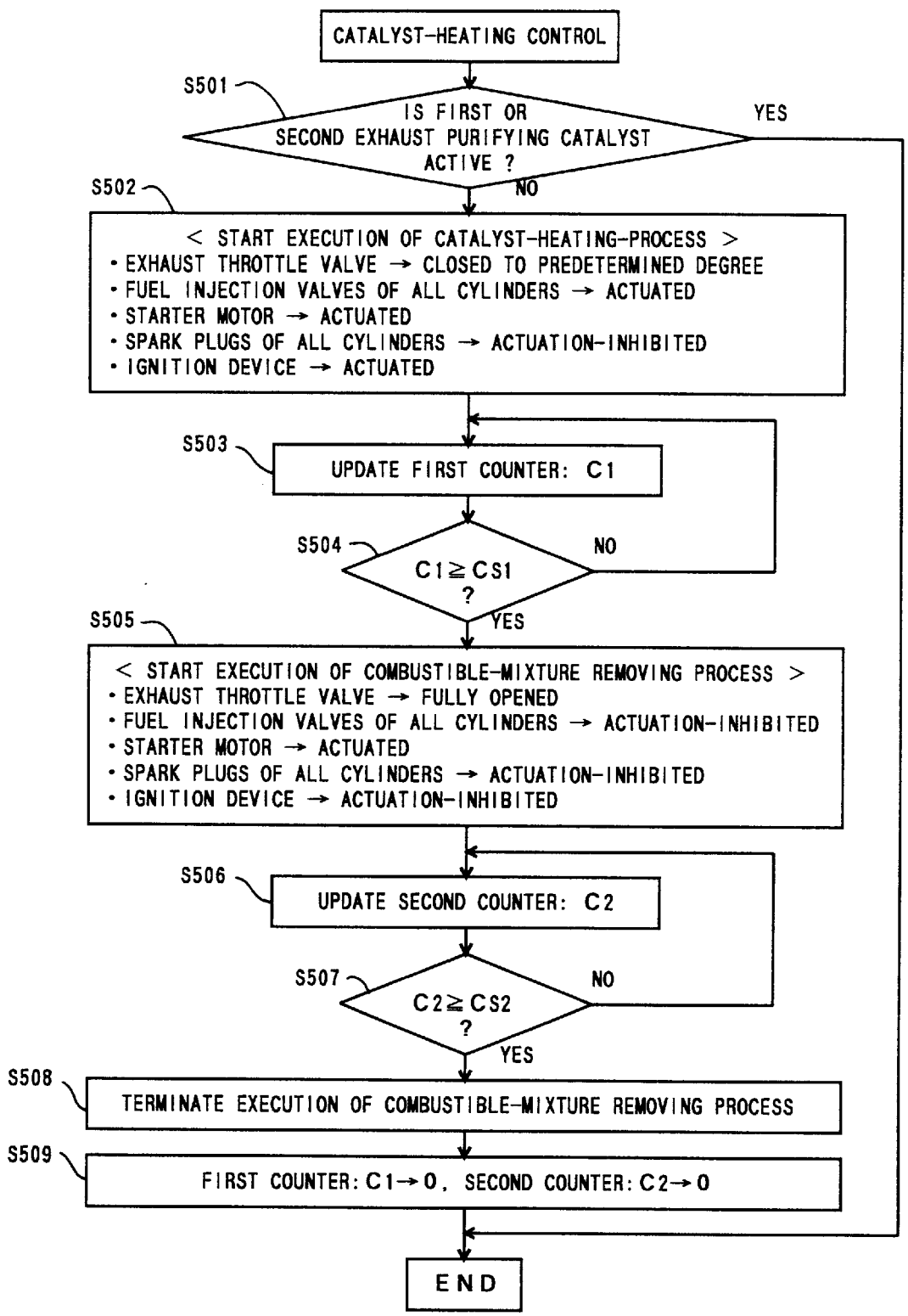
FIG. 5 is a flowchart illustrating a catalyst-heating control routine according to Embodiment 1.

The CPU 25 executes a catalyst-heating control routine as shown in FIG. 5 in order to execute the catalyst-heating control.

The catalyst-heating control routine is a routine that is pre-stored in the ROM 26 for execution upon starting of the internal combustion engine 1.

In the catalyst-heating control routine, the CPU 25 first determines in Step S501 whether the first or second exhaust-purifying catalyst 15, 16 is active or not.

The method for determining whether the first or second exhaust-purifying catalyst is active may include, for example, the determination of whether the respective catalyst-bed temperatures of the first and second exhaust-purifying catalysts 15, 16 have been lowered to a temperature lower than the respective activation temperatures or not, based on the time elapsed from the last stopping of operation of the internal combustion engine to restarting thereof 1; attaching a temperature sensor for detecting a catalyst-bed temperature to each of the first and second exhaust-purifying catalysts 15, 16, and determining whether the output signal values of the respective temperature sensors are less than the respective activation temperatures or not; or by estimating the respective catalyst-bed temperatures of the first and second exhaust-purifying catalysts 15, 16 from the output signal (cooling-water temperature) of the temperature sensor 22, and determining whether the estimated values are less than the respective activation temperatures or not.

When the CPU 25 determines in Step S501 that at least one of the first and second exhaust-purifying catalysts 15, 16 is active (preferably, the second exhaust-purifying catalyst 16 is determined active), the CPU 25 terminates execution of this routine and executes the normal start control.

When the CPU 25 determines in Step S501 that both the first and second exhaust-purifying catalysts 15, 16 are inactive, the CPU 25 proceeds to Step S502 and starts execution of the catalyst-heating process. More specifically, the CPU 25 controls the exhaust-throttling actuator 20 so as to close the exhaust throttle valve 19 to the predetermined degree. Thereafter, the CPU 25 starts application of the driving electric power to the starter motor, driving circuits 5 corresponding to the fuel injection valves 3 of all the cylinders 2a, and the ignition device 17, and, at the same time, inhibiting application of the driving electric power to the spark plugs 2b of all the cylinders 2a.

In Step S503, the CPU 25 updates a counter value of a first counter C1 for counting the execution time of the catalyst-heating process.

In Step S504, the CPU 25 determines whether the counter value of the first counter C1 updated in Step S503 is at least equal to or higher than a predetermined value CS1 or not, i.e., whether or not the catalyst-heating process has been executed at least for the predetermined time or longer.

When the CPU 25 determines in Step S504 that the counter value of the first counter C1 is less than the predetermined value CS1, the CPU 25 again executes Step S503 and subsequent steps.

On the other hand, when the CPU 25 determines in Step S504 that the counter value of the first counter C1 is equal to or higher than the predetermined value CS1, the CPU 25 proceeds to Step S505 and starts execution of the combustible-mixture removing process. More specifically, the CPU 25 inhibits application of the driving electric power to the driving circuits 5 corresponding to all the cylinders 2a, spark plugs 2b of all the cylinders 2a, and the ignition device 17, while continuing actuation of the starter motor, and, at the same time, the CPU 25 also controls the exhaust-throttling actuator 20 so that the exhaust throttle valve 19 is returned to the full-open state.

In Step S506, the CPU 25 updates a counter value of a second counter C2 for counting the execution time of the combustible-mixture removing process.

In Step S507, the CPU 25 determines whether the counter value of the second counter C2 updated in Step S506 is at least equal to a predetermined value CS2 or not, i.e., whether or not the combustible-mixture removing process has been executed at least for the predetermined time or longer.

When the CPU 25 determines in Step S507 that the counter value of the second counter C2 is less than the predetermined value CS2, the CPU 25 repeats execution of Step S506 and subsequent steps.

On the other hand, when the CPU 25 determines in Step S507 that the counter value of the second counter C2 is equal to the predetermined value CS2 or more, the CPU 25 proceeds to Step S508 and terminates execution of the combustible-mixture removing process.

In Step S509, the CPU 25 resets the respective counter values of the first and second counters C1, C2 to "zero" and terminates execution of this routine. Thereafter, the CPU 25 executes the normal engine-start control.

According to the above-described catalyst-heating control routine, when the internal combustion engine 1 is started with the first and second exhaust-purifying catalysts 15, 16 being inactive, such as when the internal combustion engine 1 is cold-started, fuel and air are supplied to the exhaust pipe 14 upstream of the first exhaust-purifying catalyst 15, thereby the fuel and air are sufficiently mixed together within the first exhaust-purifying catalyst 15, resulting in forming an excellent combustible mixture.

This combustible mixture is burned by the ignition device 17 provided in the cone portion of the second exhaust-purifying catalyst 16, and the catalyst body 16b is heated by the flame produced by the combustion of the combustible mixture.

At this time, since the exhaust throttle valve 19 has throttled the flow rate in the exhaust pipe 14, pulsation of the exhaust gas discharged from the internal combustion engine 1 is suppressed, and the atmosphere temperature within the exhaust passage is raised. As a result, the ignitability and combustion stability of the combustible mixture are improved. Moreover, when the flow rate in the exhaust passage is throttled by the exhaust throttle valve 19, the velocity at which the burned gas of the combustible mixture flows through the catalyst body 16b is decreased. Therefore, heat-conduction efficiency from the burned gas to the catalyst body 16b is improved.

Thus, according to the catalyst warming apparatus of the internal combustion engine of the present embodiment, the first exhaust-purifying catalyst 15 is disposed upstream of the second exhaust-purifying catalyst 16 to be heated, and the ignition device 17 is disposed at the cone portion of the second exhaust-purifying catalyst 16. Therefore, the fuel and air can be sufficiently mixed and desirably burned without providing a special pre-mixing chamber for mixing the fuel and air and a special combustion chamber for burning the fuel and air.

As a result, when the internal combustion engine is in the normal operating state, the heat of the exhaust gas is not transferred to the pre-mixing chamber, combustion chamber and the like, whereby the exhaust gas at a low temperature does not flow into the exhaust-purifying catalyst. Thus, the temperature of the exhaust-purifying catalyst can be prevented from being lowered to a value less than the activation temperature, whereby degradation of the exhaust emissions is avoided.

According to the catalyst warming apparatus of the internal combustion engine of the present embodiment, the second exhaust-purifying catalyst 16 is a wall-flow catalyst. Therefore, even if particulate matter (PM) such as soot is produced by combustion of the combustible mixture, the PM is caught by the second exhaust-purifying catalyst 16, and is not discharged into the air.

According to the catalyst warming apparatus of the internal combustion engine of the present embodiment, the cone portion of the second exhaust-purifying catalyst 16 has a heat insulated structure. Therefore, the heat generated by combustion of the combustible mixture is not radiated through the wall surface of the cone portion. Thus, substantially all of the heat generated by combustion of the combustible mixture can be transferred to the catalyst body 16b.

According to the catalyst warming apparatus of the internal combustion engine of the present embodiment, only the air is discharged from the internal combustion engine 1 for a pre-determined period after completion of heating the second exhaust-purifying catalyst 16. Thus, the combustible mixture remaining in the exhaust passage extending from the internal combustion engine 1 to the ignition device 17 can be removed. As a result, no flame is generated in a broad range covering from the cylinders 2a of the internal combustion engine 1 to the ignition device 17 when combustion of the mixture is started in the internal combustion engine 1.

Moreover, according to the catalytic warming apparatus of the internal combustion engine of the present embodiment, because of throttling the flow rate in the exhaust passage, the second exhaust-purifying catalyst 16 can be heated with improved ignitability and combustion stability of the combustible mixture and also with improved heat-conduction efficiency from the burned gas of the combustible mixture to the catalyst body 16b. As a result, rapid activation of the catalyst body 16b can be reliably achieved.

Embodiment 2

Hereinafter, a catalyst warming apparatus of an internal combustion engine according to Embodiment 2 of the present invention will be described with reference to FIG. 6. Herein, the structure different from that of Embodiment 1 will be described, but the description of the same structure will be omitted.

In the foregoing Embodiment 1, the fuel and air are supplied to the exhaust pipe 14 upstream of the first exhaust-purifying catalyst 15 upon cranking of the internal combustion engine 1, by injecting the fuel from the fuel injection valves 3 of all the cylinders 2a, and, at the same time, inhibiting the spark plugs 2b of all the cylinders 2a from being actuated. In the present embodiment, however, fuel and air are supplied to the exhaust pipe 14 upstream of the first exhaust-purifying catalyst 15 upon cranking of the internal combustion engine 1, by injecting the fuel only from the fuel injection valve(s) 3 of one or more of the cylinders 2a, and, at the same time, inhibiting the spark plugs 2b of all the cylinders 2a from being actuated.

Figure 6:
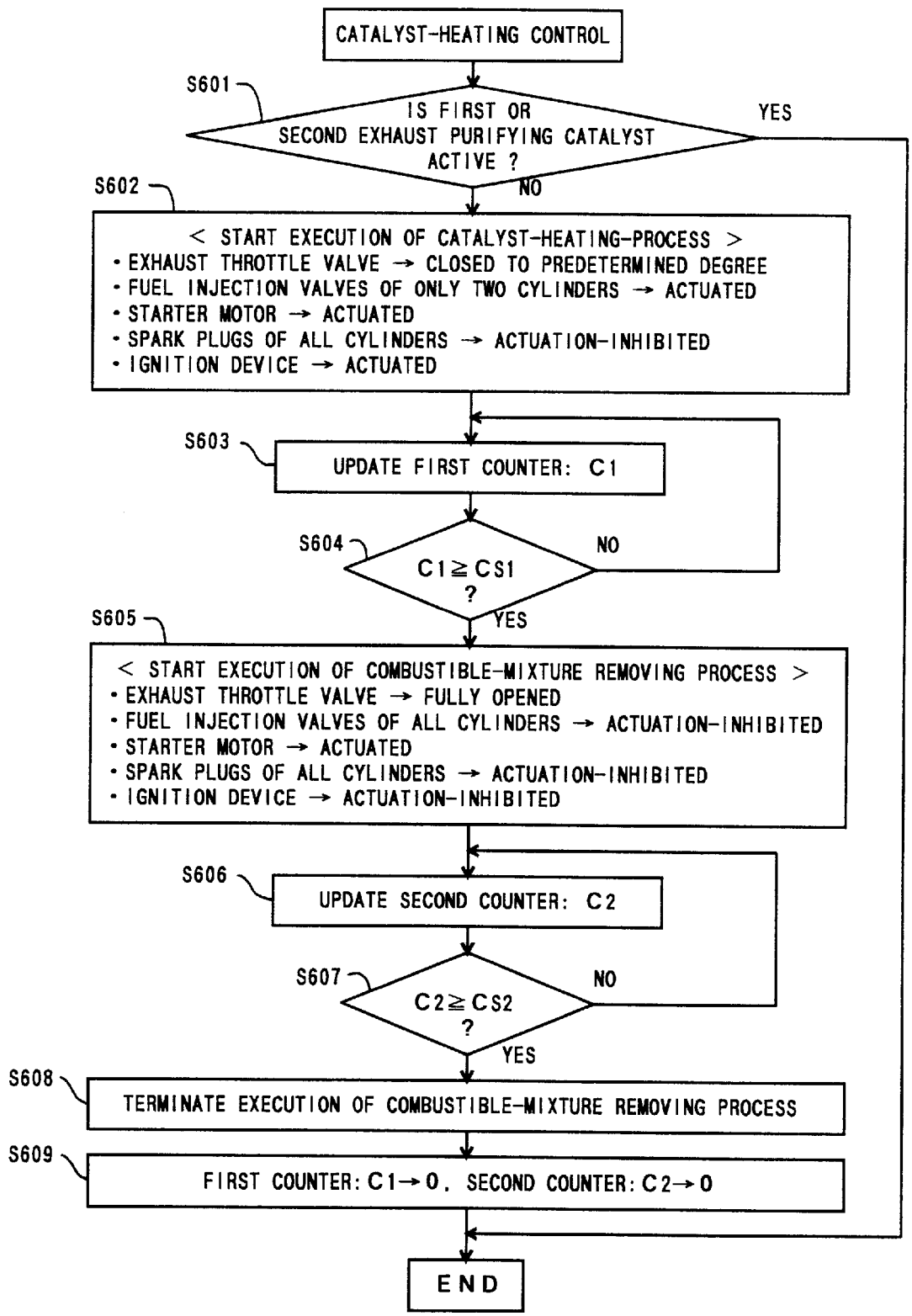
FIG. 6 is a flowchart illustrating a catalyst-heating control routine according to Embodiment 2.

In this case, the CPU 25 executes a catalyst-heating control routine as shown in FIG. 6.

The catalyst-heating control routine of FIG. 6 is a routine that is pre-stored in the ROM 26 for execution upon starting of the internal combustion engine 1.

In this catalyst-heating control routine, the CPU 25 first determines in Step S601 whether the first or second exhaust-purifying catalyst 15, 16 is active or not.

When the CPU 25 determines in Step S601 that at least one of the first and second exhaust-purifying catalysts 15, 16 is active, the CPU 25 terminates execution of this routine and executes the normal start control.

On the other hand, when the CPU 25 determines in Step S601 that both the first and second exhaust-purifying catalysts 15, 16 are inactive, the CPU 25 proceeds to Step S602 and starts execution of the catalyst-heating process. More specifically, the CPU 25 controls the exhaust-throttling actuator 20 so as to close the exhaust throttle valve 19 to the predetermined degree. Thereafter, the CPU 25 starts application of the driving electric power to the starter motor, the driving circuit(s) 5 corres-ponding to the fuel injection valve(s) 3 of one or more of the cylinders 2a (e.g., two cylinders), and the ignition device 17, and, at the same time, inhibiting application of the driving electric power to the spark plugs 2b of all the cylinders 2a.

In this case, one or more of the cylinders 2a having the actuated fuel injection valve(s) 3 discharge the fuel and air in the unburned state, whereas the other cylinder(s) 2a discharge only air. The fuel and air discharged from the aforementioned one or more cylinders 2a are supplied through the corresponding exhaust branch pipe(s) 13 to the exhaust pipe 14 upstream of the first exhaust-purifying catalyst 15.

The fuel and air supplied to the exhaust pipe 14 upstream of the first exhaust-purifying catalyst 15 flow into the first exhaust-purifying catalyst 15, where the fuel and air are sufficiently mixed together to form an excellent combustible mixture.

The combustible mixture thus formed flows out of the first exhaust-purifying catalyst 15 into the exhaust pipe 14 downstream thereof, and then, into the cone portion of the second exhaust-purifying catalyst 16. The combustible mixture flowed into the cone portion of the second-exhaust-purifying catalyst 16 is burned by the ignition device 17 provided at the cone portion, and the catalyst body 16b of the second exhaust-purifying catalyst 16 is heated by the flame generated by the combustion of the combustible mixture.

Referring back to FIG. 6, the CPU 25 proceeds to Step S603 subsequent to the process of Step S602, and updates a counter value of the first counter C1 for counting the execution time of the catalyst-heating process.

In Step S604, the CPU 25 determines whether the counter value of the first counter C1 updated in Step S603 is at least equal to or higher than the predetermined value CS1 or not, i.e., whether or not the catalyst-heating process has been executed at least for the predetermined time or longer.

When the CPU 25 determines in Step S604 that the counter value of the first counter C1 is less than the predetermined value CS1, the CPU 25 repeats execution of Step S603 and subsequent steps.

When the CPU 25 determines in Step S604 that the counter value of the first counter C1 is equal to the predetermined value CS1 or more, the CPU 25 proceeds to Step S605 and starts execution of the combustible-mixture removing process.

In Step S606, the CPU 25 updates a counter value of the second counter C2 for counting the execution time of the combustible-mixture removing process.

In Step S607, the CPU 25 determines whether the counter value of the second counter C2 updated in Step S606 is at least equal to the predetermined value CS2 or not, i.e., whether the combustible-mixture removing process has been executed at least for the predetermined time or not.

When the CPU 25 determines in Step S607 that the counter value of the second counter C2 is less than the predetermined value CS2, the CPU 25 repeats execution of Step S606 and subsequent steps.

When the CPU 25 determines in Step S607 that the counter value of the second counter C2 is equal to the predetermined value CS2 or more, the CPU 25 proceeds to Step S608 and terminates execution of the combustible-mixture removing process.

In Step S609, the CPU 25 resets the respective counter values of the first and second counters C1, C2 to "zero" and terminates execution of this routine. Thereafter, the CPU 25 executes the normal engine-start control.

According to the above-described catalyst-heating control routine, the same effects as those of Embodiment 1 can be obtained. Moreover, since only the fuel injection valve(s) 3 of one or more of the cylinders 2a are actuated, the fuel quantity required for the catalyst-heating process can be minimized.

Note that, the foregoing description of the present embodiment exemplified a case where, when the fuel and air are supplied to the exhaust pipe 14 upstream of the first exhaust-purifying catalyst 15, actuating the fuel injection valve(s) 3 only in one or more of the cylinders 2a, while inhibiting the spark plugs 2b of all the cylinders 2a from being actuated. However, heating of the exhaust-purifying catalyst and starting of the internal combustion engine 1 may be performed in parallel by allowing actuation of the spark plug(s) 2b and fuel injection valve(s) 3 in the cylinder(s) 2a other than the aforementioned one or more cylinders 2a.

Embodiment 3

Hereinafter, a catalyst warming apparatus of an internal combustion engine according to Embodiment 3 of the present invention will be described with reference to FIG. 7. Herein, the structure different from that of Embodiment 1 will be described, but the description of the same structure will be omitted.

In Embodiment 1, the catalyst-heating control is executed immediately before completion of starting of the internal combustion engine 1, i.e., during cranking of the internal combustion engine 1. In the present embodiment, however, the catalyst-heating control is performed immediately after starting of the internal combustion engine 1.

The catalyst-heating control according to the present embodiment is executed when the first and second exhaust-purifying catalysts 15, 16 are inactive at the time of completion of starting the internal combustion engine 1. In the catalyst-heating control, the CPU 25 burns the rich mixture in one or more of the cylinders 2a (e.g., two cylinders) of the internal combustion engine 1 (hereinafter, such operation is referred to as "rich-operation"), and burns the lean mixture in the other cylinder(s) 2a (e.g., the remaining two cylinders) (hereinafter, such operation is referred to as "lean-operation").

In this case, the exhaust gas discharged from the above-mentioned one or more cylinders 2a contains a large quantity of fuel in the unburned state, whereas the exhaust gas discharged from the aforementioned other cylinder(s) 2a contains a large quantity of air (oxygen) in the unburned state.

The exhaust gas containing unburned fuel components and the exhaust gas containing unburned air are led through the exhaust branch pipes 13 into the exhaust pipe 14 upstream of the first exhaust-purifying catalyst 15, and then, flow into the first exhaust-purifying catalyst 15.

In the first exhaust-purifying catalyst 15, the exhaust gas containing unburned fuel and the exhaust gas containing unburned air flow through a flow passage having an extremely smaller diameter as compared to that of the exhaust pipe 14. Therefore, the unburned fuel and air contained in the exhaust gas are sufficiently mixed as they flow through such flow passage.

As a result, in the exhaust gas flowing out of the first exhaust-purifying catalyst 15, a well-mixed, excellent combustible mixture of the fuel and air is formed. Thus, the combustible mixture is burned by the ignition device 17 in the cone portion of the second exhaust-purifying catalyst 16.

Hereinafter, the catalyst-heating control of the present embodiment will be described in detail.

The CPU 25 executes a catalyst-heating control routine as shown in FIG. 7 in order to execute the catalyst-heating control. The catalyst-heating control routine is a routine that is pre-stored in the ROM 26 for execution upon starting of the internal combustion engine 1.

In the catalyst-heating control routine, the CPU 25 first determines in Step S701 whether starting of the internal combustion engine 1 has been completed or not. The method of making the determination of completion of starting the internal combustion engine 1 may include, for example, determining whether or not the engine speed is increased at least to a predetermined value or higher.

When the CPU 25 determines in Step S701 that starting of the internal combustion engine 1 has not been completed, the CPU 25 repeatedly performs Step S701 until starting of the internal combustion engine 1 is completed.

When the CPU 25 determines in Step S701 that starting of the internal combustion engine 1 has been completed, the CPU 25 proceeds to Step S702 and determines whether the first or second exhaust-purifying catalyst 15, 16 is active or not.

When the CPU 25 determines in Step S702 that at least one of the first and second exhaust-purifying catalysts 15, 16 is active, the CPU 25 terminates execution of this routine and executes the normal start control.

When the CPU 25 determines in Step S702 that both the first and second exhaust-purifying catalysts 15, 16 are inactive, the CPU 25 proceeds to Step S703 and starts execution of catalyst-heating process.

In the catalyst-heating process, the CPU 25 performs rich-operation of, for example, first and second cylinders out of the four cylinders 2a of the internal combustion engine 1, by controlling the driving circuits 5 corresponding to the first and second cylinders so as to produce the mixture having an air-fuel ratio lower than the theoretical air-fuel ratio (i.e., rich air-fuel ratio) in the first and second cylinders. At the same time, the CPU 25 performs lean-operation of the remaining third and fourth cylinders, by controlling the driving circuits 5 corresponding to the third and fourth cylinders so as to produce a mixture having an air-fuel ratio higher than the theoretical air-fuel ratio (i.e., lean air-fuel ratio) in the third and fourth cylinders.

In this case, the first and second cylinders of rich-operation discharge the exhaust gas containing a large quantity of unburned fuel, whereas the third and fourth cylinders of lean-operation discharge the exhaust gas containing a large quantity of unburned air (oxygen). The exhaust gas discharged from the first and second cylinders (i.e., the exhaust gas containing unburned fuel) and the exhaust gas discharged from the third and fourth cylinders (i.e., the exhaust gas containing unburned air) are supplied through the exhaust branch pipes 13 to the exhaust pipe 14 upstream of the first exhaust-purifying catalyst 15.

The fuel and air contained in the exhaust gas are mixed to form an excellent combustible mixture within the first exhaust-purifying catalyst 15. The exhaust gas containing such combustible mixture flows out of the first exhaust-purifying catalyst 15 into the exhaust pipe 14 downstream thereof, and then, from the exhaust pipe 14 into the cone portion of the second exhaust-purifying catalyst 16. The combustible mixture flowed into the cone portion of the second exhaust-purifying catalyst 16 is burned by the ignition device 17 provided at the cone portion, and the catalyst body 16b of the second exhaust-purifying catalyst 16 is heated by the flame generated by such combustion of the combustible mixture.

Referring back to FIG. 7, the CPU 25 proceeds to Step S704 subsequent to the process of Step S703, and updates a counter value of a counter C for counting the execution time of the catalyst-heating process.

In Step S705, the CPU 25 determines whether the counter value of the counter C updated in Step S704 is at least equal to a predetermined value CS or not, i.e., whether or not the catalyst-heating process has been executed at least for the predetermined time or longer.

When the CPU 25 determines in Step S705 that the counter value of the counter C is less than the predetermined value CS, the CPU 25 repeats execution of Step S704 and subsequent steps.

When the CPU 25 determines in Step S705 that the counter value of the counter C is equal to the predetermined value CS or more, the CPU 25 proceeds to Step S706, and terminates execution of the catalyst-heating process. The CPU 25 resets the counter value of the counter C to "zero," and controls the driving circuits 5 so as to render the internal combustion engine 1 into the normal operating state.

According to the above-described catalyst-heating control routine, in the case where the second exhaust-purifying catalyst 16 is heated after starting of the internal combustion engine, the fuel and air can be sufficiently mixed and desirably burned without requiring a special pre-mixing chamber for mixing the fuel and air and a special combustion chamber for burning the fuel and air because the first exhaust-purifying catalyst 15 is disposed upstream of the second exhaust-purifying catalyst 16, and the ignition device 17 is disposed at the cone portion of the second exhaust-purifying catalyst 16.

As a result, when the internal combustion engine is in the normal operating state, the heat of the exhaust gas is not transferred to the pre-mixing chamber, combustion chamber and the like, whereby the exhaust gas at a low temperature does not flow into the exhaust-purifying catalyst. Thus, the temperature of the exhaust-purifying catalyst can be prevented from being lowered to a value less than the activation temperature, whereby degradation of the exhaust emissions is avoided.

Note that, in the present embodiment, the mixture having a lean air-fuel ratio is burned in the cylinder(s) 2a which are to discharge unburned air. However, it is also possible to inhibit fuel injection to the cylinder(s) 2a which are to discharge unburned air.

Embodiment 4

Hereinafter, a catalyst warming apparatus of an internal combustion engine according to Embodiment 4 of the present invention will be described with reference to FIG. 8. Herein, the structure different from that of Embodiment 3 will be described, but the description of the same structure will be omitted.

In the above-described Embodiment 3, one or more of the cylinders 2a are rich-operated so as to discharge the exhaust gas containing unburned fuel immediately after completion of starting of the internal combustion engine 1. In the present embodiment, however, one or more of the cylinders 2a are operated at a normal air-fuel ratio. Then, the fuel is secondarily injected from the corresponding fuel injection valve(s) 3 during the expansion or exhaust stroke of the one or more cylinders 2a, so that the aforementioned one or more cylinders 2a are made to discharge the exhaust gas containing unburned fuel.

Figure 8:
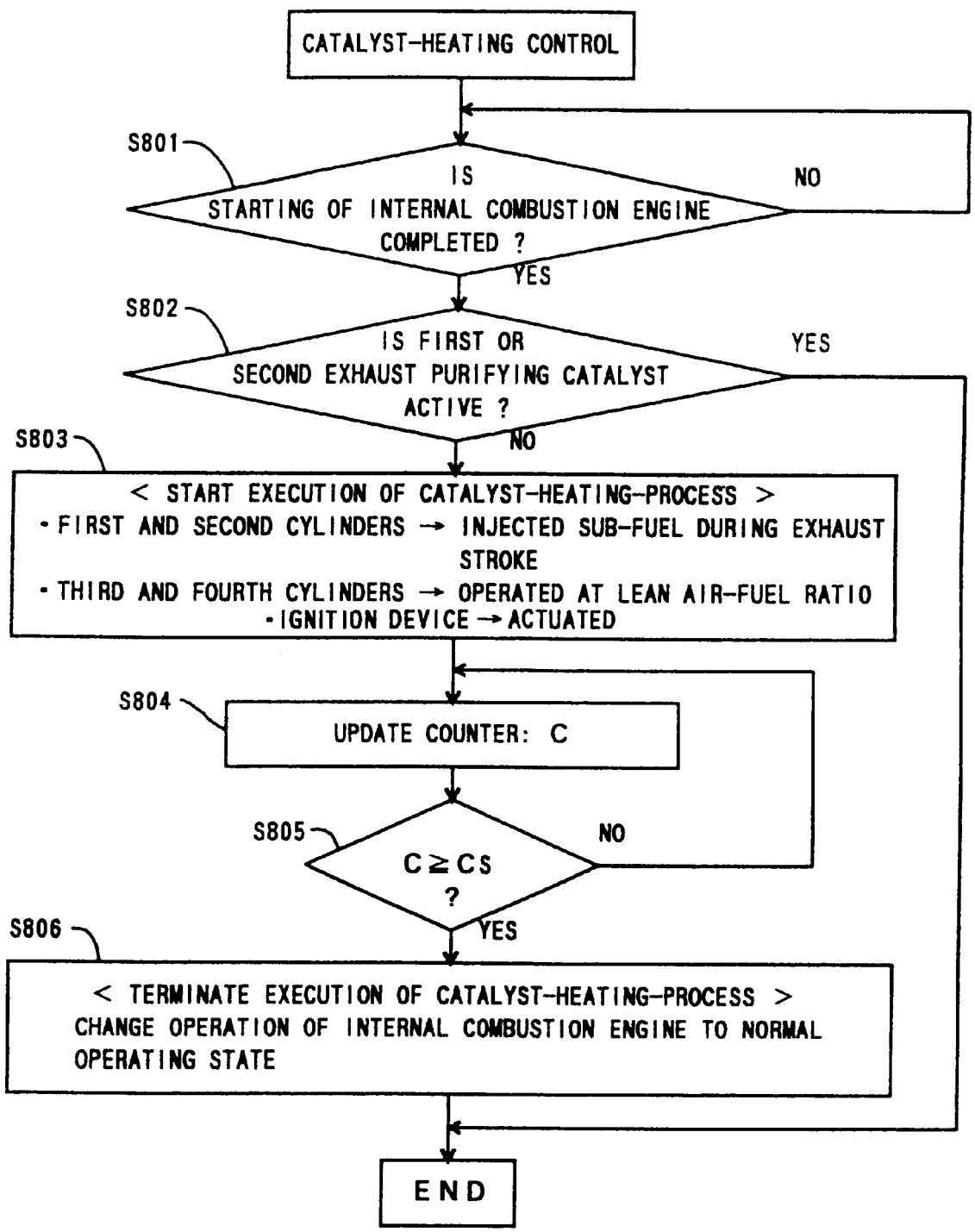
FIG. 8 is a flowchart illustrating a catalyst-heating control routine according to Embodiment 4.

In this case, the CPU 25 executes a catalyst-heating control routine as shown in FIG. 8.

The catalyst-heating control routine of FIG. 8 is a routine that is pre-stored in the ROM 26 for execution upon starting of the internal combustion engine 1.

In the catalyst-heating control routine, the CPU 25 first determines in Step S801 whether starting of the internal combustion engine 1 has been completed or not.

When the CPU 25 determines in Step S801 that starting of the internal combustion engine 1 has not been completed, the CPU 25 repeatedly performs Step S801 until starting of the internal combustion engine 1 is completed.

When the CPU 25 determines in Step S801 that starting of the internal combustion engine 1 has been completed, the CPU 25 proceeds to Step S802 and determines whether the first or second exhaust-purifying catalyst 15, 16 is active or not.

When the CPU 25 determines in Step S802 that at least one of the first and second exhaust-purifying catalysts 15, 16 is active, the CPU 25 terminates execution of this routine and executes the normal start control.

When the CPU 25 determines in Step S802 that both the first and second exhaust-purifying catalysts 15, 16 are inactive, the CPU 25 proceeds to Step S803 and starts execution of catalyst-heating process.

In the catalyst-heating process, the CPU 25, for example, controls the driving circuits 5 corresponding to first and second cylinders out of the four cylinders 2a of the internal combustion engine 1 so as to produce a mixture having a normal air-fuel ratio in the first and second cylinders, and also controls these driving circuits 5 so as to secondarily inject the fuel from the corresponding fuel injection valves 3 during the exhaust stroke of the first and second cylinders. At the same time, the CPU 25 controls the driving circuits 5 corresponding to the remaining third and fourth cylinders so as to produce a mixture having an air-fuel ratio higher than the theoretical air-fuel ratio (i.e., lean air-fuel ratio) in the third and fourth cylinders. Thus, the CPU 25 performs lean-operation of the third and fourth cylinders.

In this case, the first and second cylinders discharge the exhaust gas containing the sub fuel, whereas the third and fourth cylinders discharge the exhaust gas containing a large quantity of unburned air (oxygen). The exhaust gas discharged from the first and second cylinders (i.e., the exhaust gas containing unburned fuel) and the exhaust gas discharged from the third and fourth cylinders (i.e., the exhaust gas containing unburned air) are supplied through the exhaust branch pipes 13 to the exhaust pipe 14 upstream of the first exhaust-purifying catalyst 15.

The fuel and air contained in the exhaust gas are mixed to form an excellent combustible mixture within the first exhaust-purifying catalyst 15. The exhaust gas containing such combustible mixture flows out of the first exhaust-purifying catalyst 15 into the exhaust pipe 14 downstream thereof, and then, flows into the cone portion of the second exhaust-purifying catalyst 16. The combustible mixture flowing into the cone portion of the second exhaust-purifying catalyst 16 is burned by the ignition device 17 provided at the cone portion, and the catalyst body 16b of the second exhaust-purifying catalyst 16 is heated by the flame generated by such combustion.

Referring back to FIG. 8, the CPU 25 proceeds to Step S804 subsequent to the process of Step S803, and updates a counter value of the counter C for counting the execution time of the catalyst-heating process.

In Step S805, the CPU 25 determines whether the counter value of the counter C updated in the Step S804 is at least equal to the predetermined value CS or not, i.e., whether or not the catalyst-heating process has been executed at least for the predetermined time or longer.

When the CPU 25 determines in Step S805 that the counter value of the counter C is less than the predetermined value CS, the CPU 25 repeats execution of Step S804 and subsequent steps.

When the CPU 25 determines in Step S805 that the counter value of the counter C is equal to the predetermined value CS or more, the CPU 25 proceeds to Step S806, and terminates execution of the catalyst-heating process. The CPU 25 resets the counter value of the counter C to "zero," and controls the driving circuits 5 so as to render the internal combustion engine 1 into the normal operating state.

According to the above-described catalyst-heating control routine, the same effects as those of Embodiment 3 can be obtained.

Embodiment 5

Hereinafter, a catalyst warming apparatus of an internal combustion engine according to Embodiment 5 of the present invention will be described with reference to FIGS. 9 to 11. Herein, the structure different from that of Embodiment 3 will be described, but the description of the same structure will be omitted.

In the above-described Embodiment 3, in the case where the unburned fuel and air are supplied upstream of the first exhaust-purifying catalyst 15 immediately after completion of starting of the internal combustion engine 1, one or more of the cylinders 2a of the internal combustion engine 1 are rich-operated, whereas the other cylinder(s) 2a are lean-operated. As a result, the aforementioned one or more cylinders 2a discharge the exhaust gas containing unburned fuel, whereas the aforementioned other cylinder(s) 2a discharge the exhaust gas containing unburned air. In the present embodiment, however, all the cylinders 2a of the internal combustion engine 1 are rich-operated, and the sub air is supplied to the exhaust gas discharged from all the cylinders 2a. Thus, the exhaust gas containing unburned fuel and unburned air is supplied upstream of the first exhaust-purifying catalyst 15.

Figure 9:
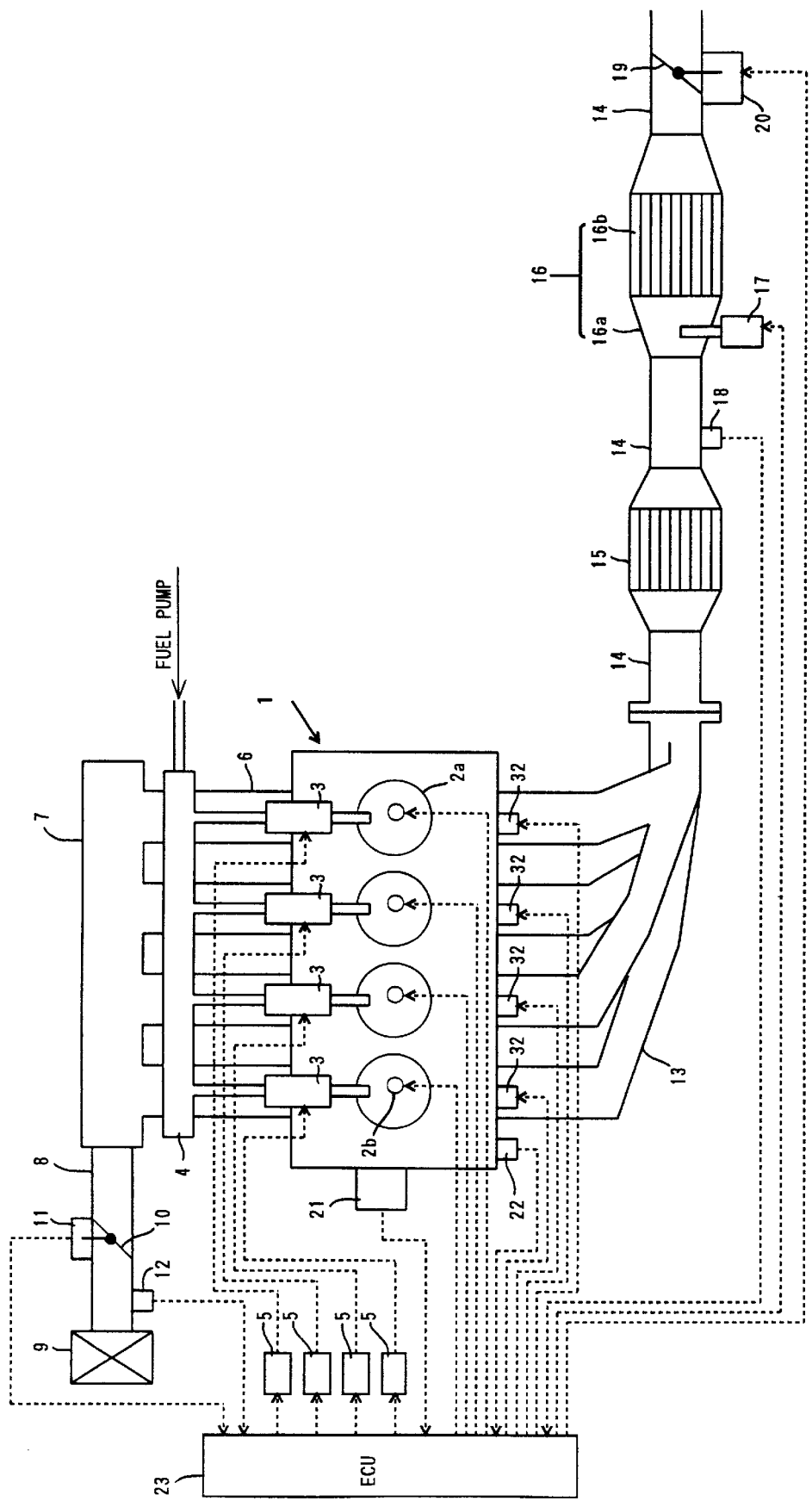
FIG. 9 is a diagram showing a schematic structure of an internal combustion engine to which a catalyst warming apparatus according to Embodiment 5 is applied.

Each exhaust branch pipe 13 connected to the internal combustion engine 1 is provided with a sub air injection nozzle 32 having its injection port facing the exhaust port of the corresponding cylinder 2a, as shown in FIG. 9.

Figure 10:
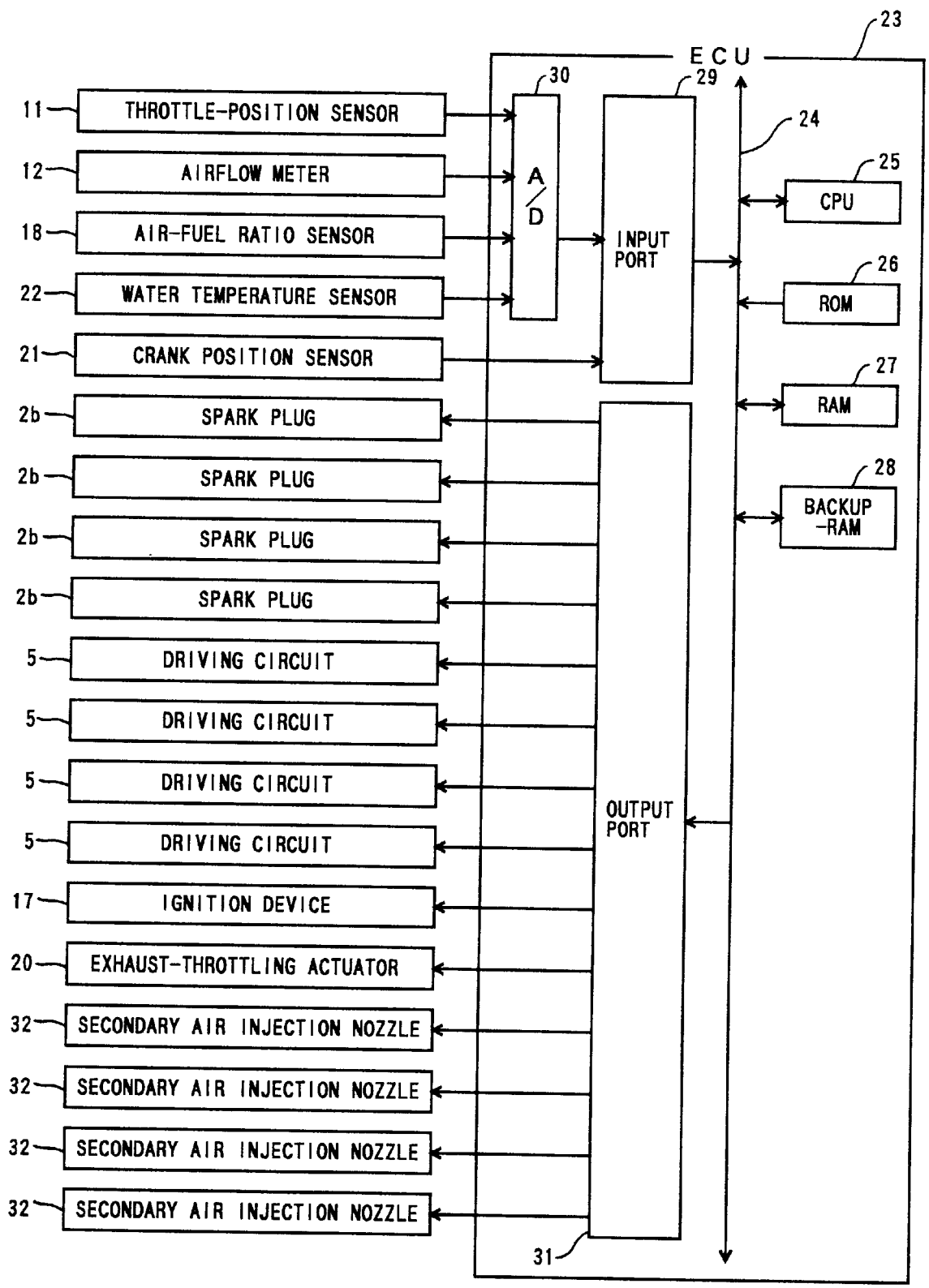
FIG. 10 is a block diagram showing an internal structure of an ECU according to Embodiment 5.

As shown in FIG. 10, the sub air injection nozzles 32 are connected to the output port 31 of the ECU 23 through electrical wiring, and the sub air injection nozzles 32 are opened in response to application of the electric driving power from the ECU 23, and inject the sub air supplied from an unillustrated air pump into the exhaust ports of the respective cylinders 2a.

Hereinafter, the catalyst-heating control of the present embodiment will be described.

Figure 11:
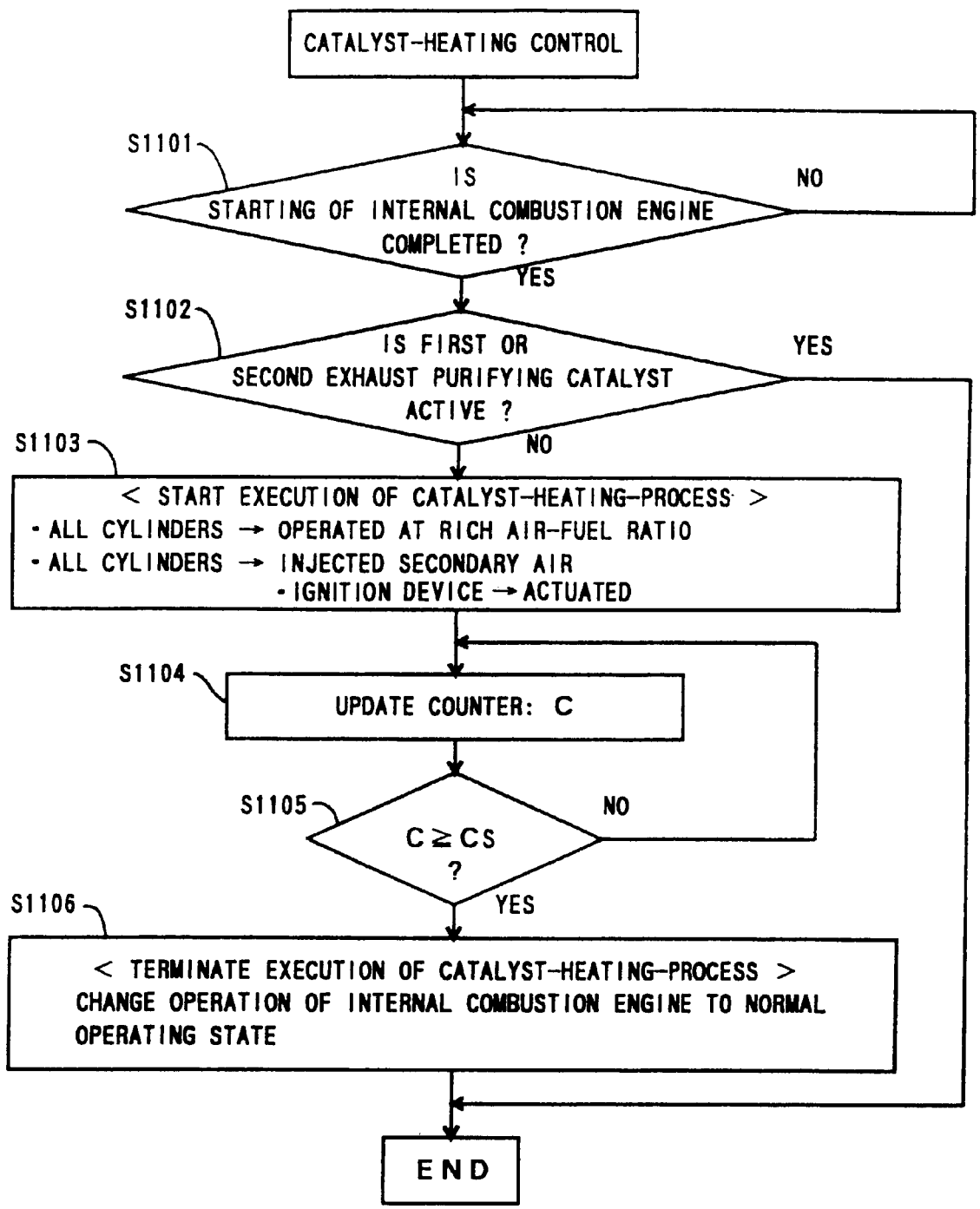
FIG. 11 is a flowchart illustrating a catalyst-heating control routine according to Embodiment 5.

According to the present embodiment, the CPU 25 executes a catalyst-heating control routine as shown in FIG. 11 in order to execute the catalyst-heating control. This catalyst-heating control routine is a routine that is pre-stored in the ROM 26 for execution at the time of starting of the internal combustion engine 1.

In the catalyst-heating control routine, the CPU 25 first determines in Step S1101 whether starting of the internal combustion engine 1 has been completed or not.

When the CPU 25 determines in Step S1101 that starting of the internal combustion engine 1 has not been completed, the CPU 25 repeatedly performs Step S1101 until starting of the internal combustion engine 1 is completed.

When the CPU 25 determines in Step S1101 that starting of the internal combustion engine 1 has been completed, the CPU 25 proceeds to Step S1102 and determines whether the first or second exhaust-purifying catalyst 15, 16 is active or not.

When the CPU 25 determines in Step S1102 that at least one of the first and second exhaust-purifying catalysts 15, 16 is active, the CPU 25 terminates execution of this routine and executes the normal start control.

When the CPU 25 determines in Step S1102 that both the first and second exhaust-purifying catalysts 15, 16 are inactive, the CPU 25 proceeds to Step S1103 and starts the catalyst-heating process.

In the catalyst-heating process, the CPU 25 performs, for example, the rich-operation of all the cylinders 2a of the internal combustion engine 1 so as to discharge the exhaust gas containing a large quantity of unburned fuel from all the cylinders 2a. At the same time, the CPU 25 applies the driving electric power to the sub air injection nozzles 32 so as to inject the sub air to the exhaust ports of the respective cylinders 2a.

In this case, the exhaust gas containing a large quantity of unburned fuel and the sub air are supplied to the exhaust ports of all the cylinders 2a of the internal combustion engine 1. The exhaust gas and the sub air are led from the exhaust ports to the exhaust branch pipes 13, and then, flow through the exhaust pipe 14 into the first exhaust-purifying catalyst 15.

The unburned fuel contained in the exhaust gas and the sub air are mixed to form an excellent combustible mixture within the first exhaust-purifying catalyst 15. The exhaust gas containing such combustible mixture flows out of the first exhaust-purifying catalyst 15 into the exhaust pipe 14 downstream thereof, and then, flows into the cone portion of the second exhaust-purifying catalyst 16. The combustible mixture flowing into the cone portion of the second exhaust-purifying catalyst 16 is burned by the ignition device 17 provided at the cone portion, and the catalyst body 16b of the second exhaust-purifying catalyst 16 is heated by the flame generated by such combustion.

Referring back to FIG. 11, the CPU 25 proceeds to Step S1104 subsequent to the process of Step S1103, and updates a counter value of the counter C for counting the execution time of the catalyst-heating process.

In Step S1105, the CPU 25 determines whether the counter value of the counter C updated in the Step S1104 is at least equal to the predetermined value CS or not, i.e., whether or not the catalyst-heating process has been executed at least for the predetermined time or longer.

When the CPU 25 determines in Step S1105 that the counter value of the counter C is less than the predetermined value CS, the CPU 25 repeats execution of Step S1104 and subsequent steps.

When the CPU 25 determines in Step S1105 that the counter value of the counter C is equal to the predetermined value CS or more, the CPU 25 proceeds to Step S1106, and terminates execution of the catalyst-heating process. The CPU 25 resets the counter value of the counter C to "zero," and controls the driving circuits 5 so as to render the internal combustion engine 1 into the normal operating state.

According to the above-described catalyst-heating control routine, the same effects as those of Embodiment 3 can be obtained.

Embodiment 6

Hereinafter, a catalyst warming apparatus of an internal combustion engine according to Embodiment 6 of the present invention will be described with reference to FIG. 12. Herein, the structure different from that of Embodiment 5 will be described, but the description of the same structure will be omitted.

In the above-described Embodiment 5, in the case when the exhaust gas containing unburned fuel and air is supplied upstream of the first exhaust-purifying catalyst 15 immediately after completion of starting of the internal combustion engine 1, all the cylinders 2a of the internal combustion engine 1 are rich-operated, and the sub air is supplied to the exhaust gas discharged from all the cylinders 2a. In the present embodiment, however, all the cylinders 2a of the internal combustion engine 1 are operated at a normal air-fuel ratio. During the exhaust stroke of the cylinders 2a, the fuel is secondarily injected from the respective fuel injection valves 3, and the sub air is injected from the respective sub air injection nozzles 32. Thus, the exhaust gas containing unburned fuel (sub fuel) and unburned air (sub air) is supplied upstream of the first exhaust-purifying catalyst 15.

Figure 12:
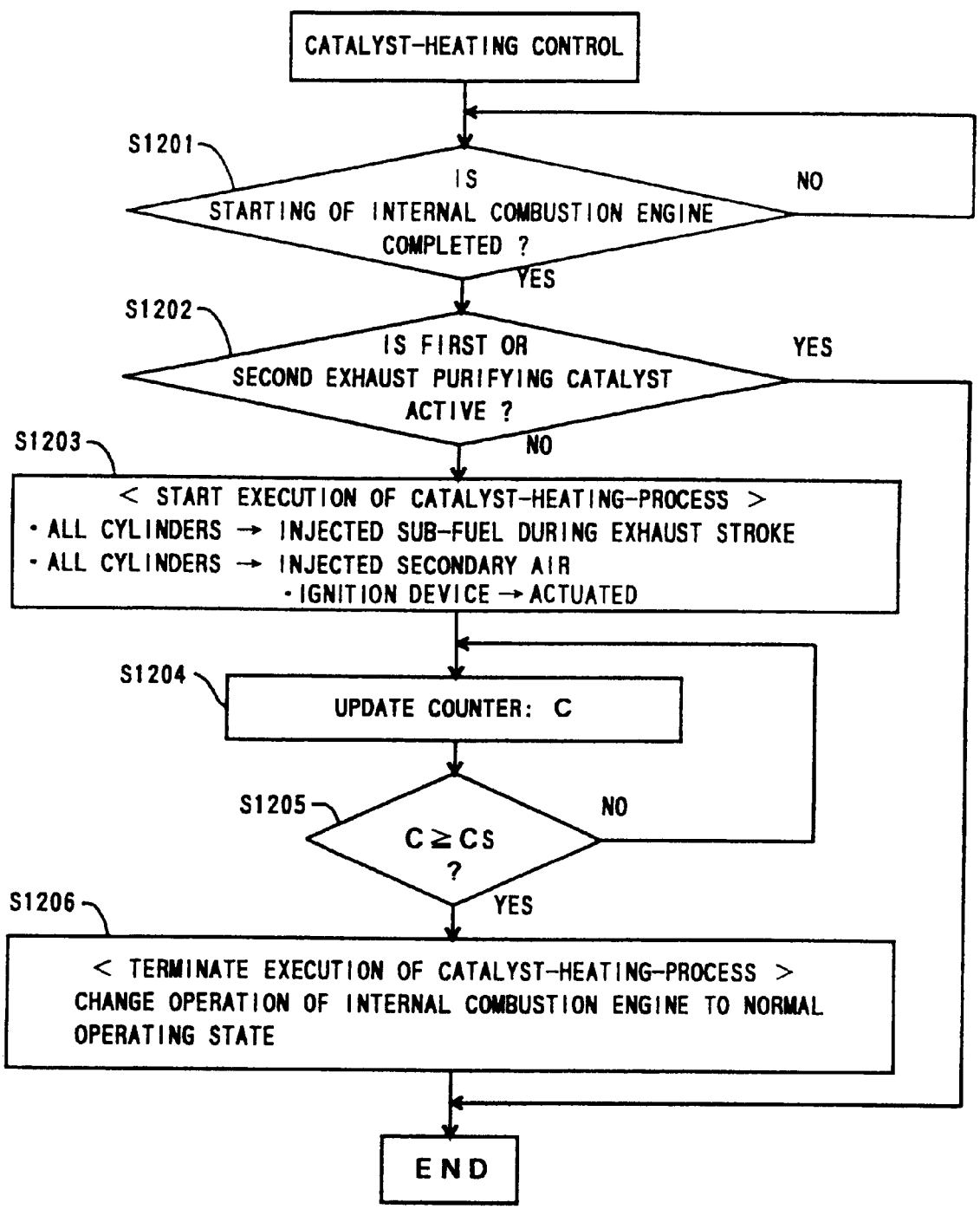
FIG. 12 is a flowchart illustrating a catalyst-heating control routine according to Embodiment 6.

In this case, the CPU 25 executes a catalyst-heating control routine as shown in FIG. 12.

The catalyst-heating control routine of FIG. 12 is a routine that is pre-stored in the ROM 26 for execution at the time of starting of the internal combustion engine 1.

In the catalyst-heating control routine, the CPU 25 first determines in Step S1201 whether starting of the internal combustion engine 1 has been completed or not.

When the CPU 25 determines in Step S1201 that starting of the internal combustion engine 1 has not been completed, the CPU 25 repeatedly performs Step S1201 until starting of the internal combustion engine 1 is completed.

When the CPU 25 determines in Step S1201 that starting of the internal combustion engine 1 has been completed, the CPU 25 proceeds to Step S1202 and determines whether the first or second exhaust-purifying catalyst 15, 16 is active or not.

When the CPU 25 determines in Step S1202 that at least one of the first and second exhaust-purifying catalysts 15, 16 is active, the CPU 25 terminates execution of this routine and executes the normal start control.

When the CPU 25 determines in Step S1202 that both the first and second exhaust-purifying catalysts 15, 16 are inactive, the CPU 25 proceeds to Step S1203 and starts the catalyst-heating process.

In the catalyst-heating process, the CPU 25, for example, operates all the cylinders 2a of the internal combustion engine 1 at a normal air-fuel ratio. During the exhaust stroke of the cylinders 2a, the CPU 25 secondarily injects the fuel from the respective fuel injection valves 3 so that the exhaust gas containing unburned sub fuel is discharged from the cylinders 2a. Moreover, the CPU 25 applies the driving electric power to the sub air injection nozzles 32 so as to inject the sub air to the exhaust ports of the respective cylinders 2a.

In this case, the exhaust gas containing a large quantity of unburned sub fuel and the sub air are supplied to the exhaust ports of all the cylinders 2a of the internal combustion engine 1. The exhaust gas and the sub air are led from the exhaust ports to the exhaust branch pipes 13, and then, flow through the exhaust pipe 14 into the first exhaust-purifying catalyst 15.

The unburned sub fuel contained in the exhaust gas and the sub air are mixed to form an excellent combustible mixture within the first exhaust-purifying catalyst 15. The exhaust gas containing such combustible mixture flows out of the first exhaust-purifying catalyst 15 into the exhaust pipe 14 downstream thereof, and then, flows into the cone portion of the second exhaust-purifying catalyst 16. The combustible mixture flowing into the cone portion of the second exhaust-purifying catalyst 16 is burned by the ignition device 17 provided at the cone portion, and the catalyst body 16b of the second exhaust-purifying catalyst 16 is heated by the flame generated by such combustion.

Referring back to FIG. 12, the CPU 25 proceeds to Step S1204 subsequent to the process of Step S1203, and updates a counter value of the counter C for counting the execution time of the catalyst-heating process.

In Step S1205, the CPU 25 determines whether the updated counter value of the counter C is at least equal to the predetermined value CS or not, i.e., whether or not the catalyst-heating process has been executed at least for the predetermined time or longer.

When the CPU 25 determines in Step S1205 that the counter value of the counter C is less than the predetermined value CS, the CPU 25 repeats execution of Step S1204 and subsequent steps.

When the CPU 25 determines in Step S1205 that the counter value of the counter C is equal to the predetermined value CS or more, the CPU 25 proceeds to Step S1206, and terminates execution of the catalyst-heating process. The CPU 25 resets the counter value of the counter C to "zero," and controls the driving circuits 5 so as to render the internal combustion engine 1 into the normal operating state.

According to the above-described catalyst-heating control routine, the same effects as those of Embodiment 5 can be obtained, while operating the internal combustion engine 1 at a normal air-fuel ratio.

Embodiment 7

Hereinafter, a catalyst warming apparatus of an internal combustion engine according to Embodiment 7 of the present invention will be described with reference to FIGS. 13 to 15. Herein, the structure different from that of Embodiment 3 will be described, but the description of the same structure will be omitted.

In the above-described Embodiment 3, in the case where immediately after completion of starting of the internal combustion engine 1, one or more of the cylinders 2a are rich-operated so as to discharge the exhaust gas containing unburned fuel from the one or more of the cylinders 2a. In the present embodiment, however, a so-called exhaust gas recirculation (EGR) is carried out for recirculating the exhaust gas to one or more of the cylinders 2a so that low-temperature combustion is performed in the one or more cylinders 2a. Thus, the combustion temperature of the mixture in the aforementioned one or more cylinders 2a is lowered, whereby the exhaust gas containing a large quantity of unburned fuel components is discharged.

Figure 13:
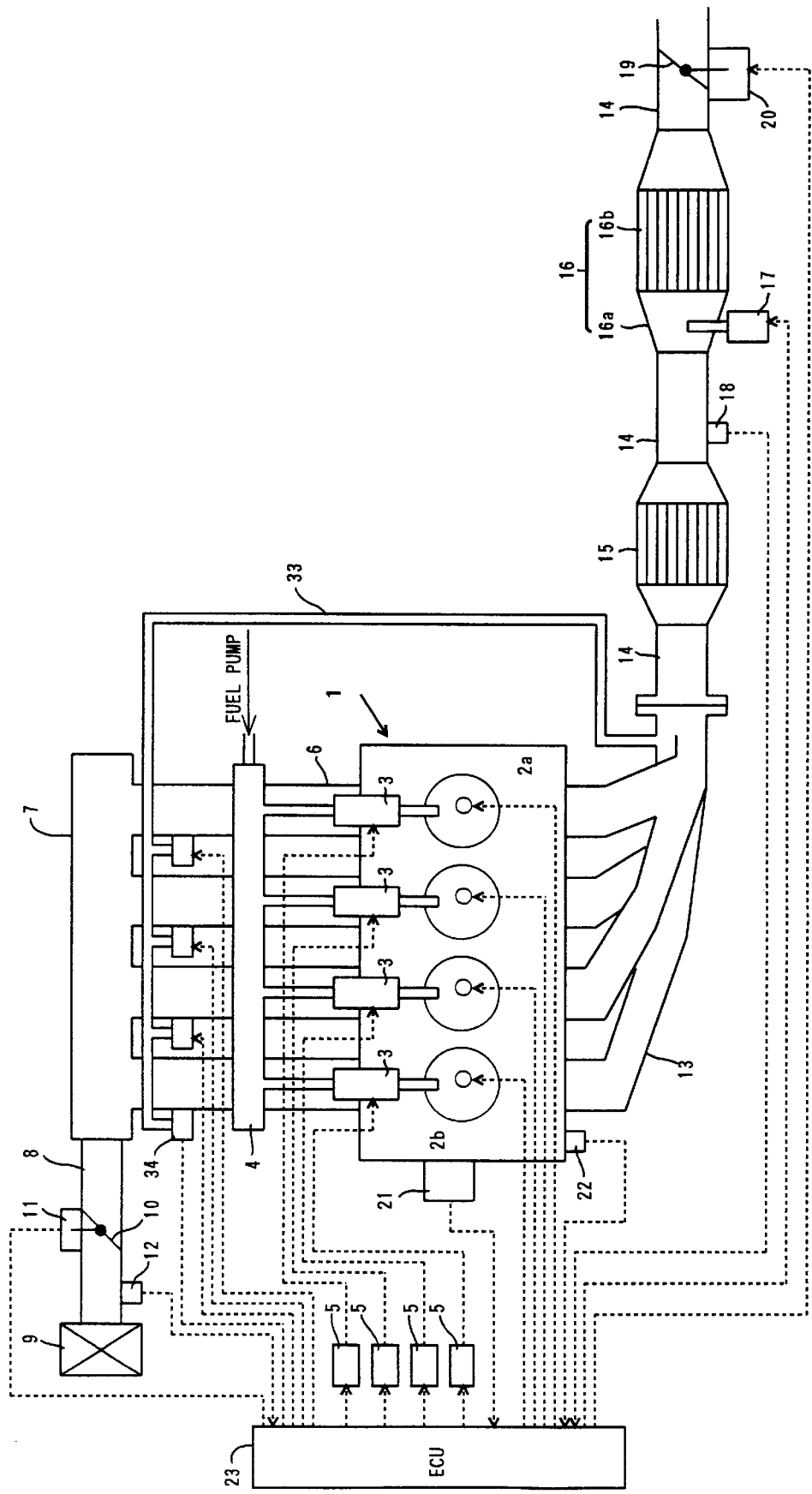
FIG. 13 is a diagram showing a schematic structure of an internal combustion engine to which a catalyst warming apparatus according to Embodiment 7 is applied.

As shown in FIG. 13, an exhaust-gas-recirculation (EGR) passage 33 is connected to the exhaust branch pipes 13. The EGR passage 33 branches to be connected to each intake branch pipe 6. An exhaust-gas-recirculation (EGR) valve 34 for enabling and blocking communication between the EGR passage 33 and the corresponding intake branch pipe 6 is provided at the connection between the EGR passage 33 and each intake branch pipe 6.

Figure 14:
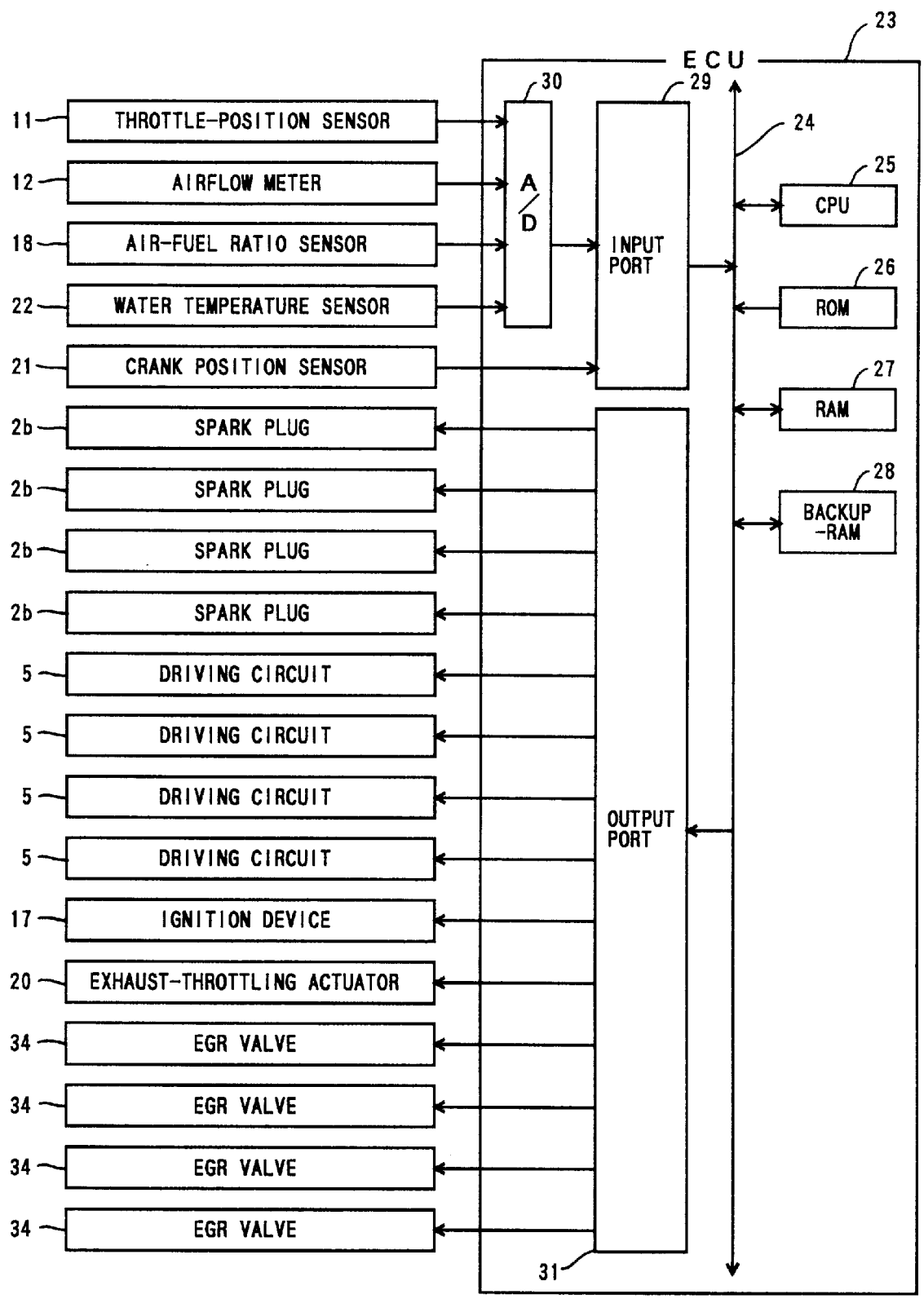
FIG. 14 is a block diagram showing an internal structure of an ECU according to Embodiment 7.

As shown in FIG. 14, the EGR valves 34 are connected to the output port 31 of the ECU 23 through electrical wiring, so that the EGR valves 14 are opened and closed according to a control current from the ECU 23.

Hereinafter, the catalyst-heating control according to the present embodiment will be described.

Figure 15:
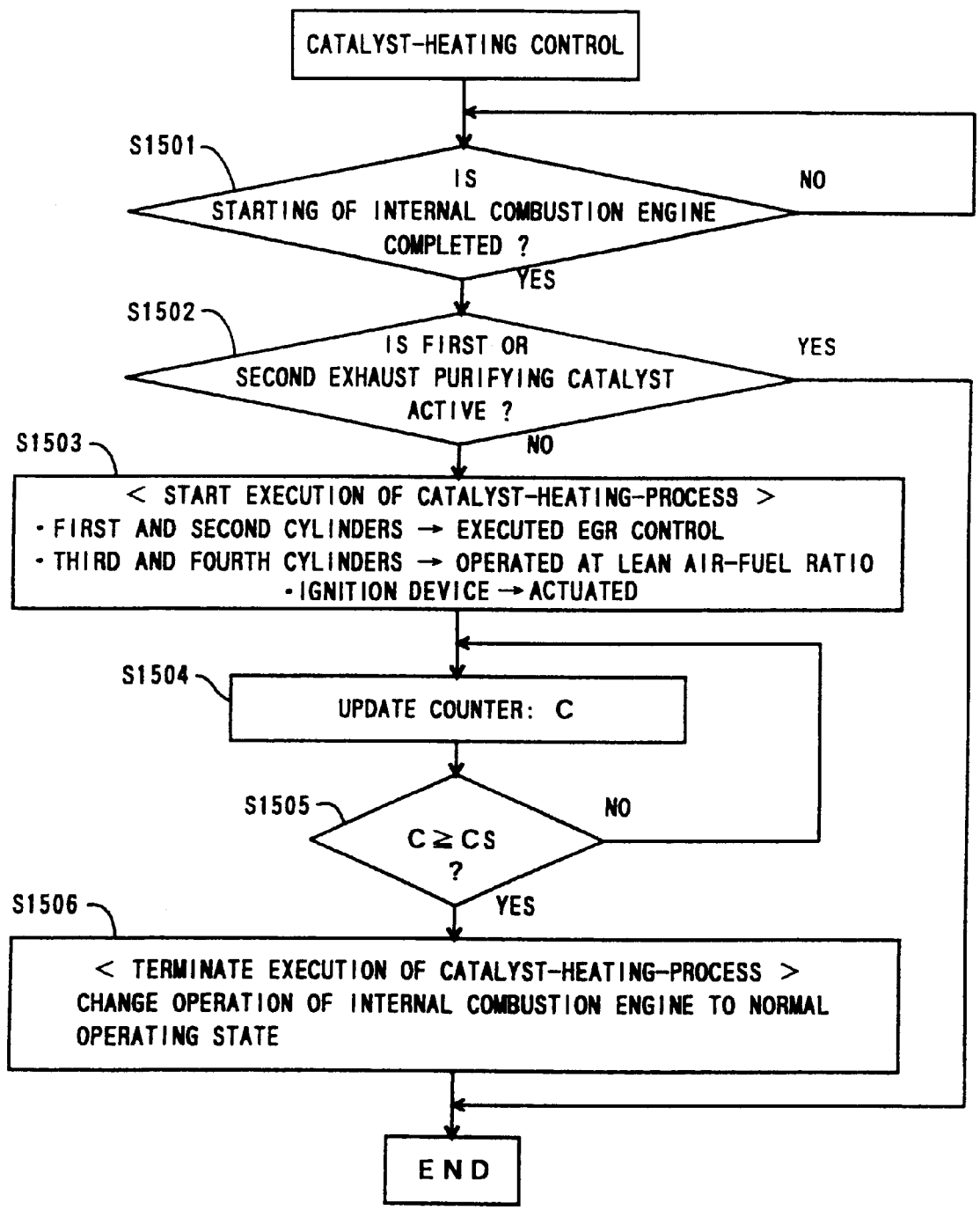
FIG. 15 is a flowchart illustrating a catalyst-heating control routine according to Embodiment 7.

In the present embodiment, the CPU 25 executes a catalyst-heating control routine as shown in FIG. 15 in order to execute the catalyst-heating control. The catalyst-heating control routine is a routine that is pre-stored in the ROM 26 for execution at the time of starting of the internal combustion engine 1.

In the catalyst-heating control routine, the CPU 25 first determines in Step S1501 whether starting of the internal combustion engine 1 has been completed or not.

When the CPU 25 determines in Step S1501 that starting of the internal combustion engine 1 has not. been completed, the CPU 25 repeatedly performs Step S1501 until starting of the internal combustion engine 1 is completed.

When the CPU 25 determines in Step S1501 that starting of the internal combustion engine 1 has been completed, the CPU 25 proceeds to Step S1502 and determines whether the first or second exhaust-purifying catalyst 15, 16 is active or not.

When the CPU 25 determines in Step S1502 that at least one of the first and second exhaust-purifying catalysts 15, 16 is active, the CPU 25 terminates execution of this routine and executes the normal start control.

When the CPU 25 determines in Step S1502 that both the first and second exhaust-purifying catalysts 15, 16 are inactive, the CPU 25 proceeds to Step S1503 and starts the catalyst-heating process.

In the catalyst-heating process, the CPU 25, for example, opens the EGR valve(s) 34 corresponding to one or more of the cylinders 2a (e.g., first and second cylinders) of the internal combustion engine 1 for low-temperature combustion. Thus, the exhaust gas containing a relatively large quantity of unburned fuel components is discharged from the aforementioned one or more cylinders 2a. At the same time, the CPU 25 performs lean-operation of the other cylinder(s) 2a (e.g., third and fourth cylinders), whereby the exhaust gas containing a relatively large quantity of unburned air is discharged from the other cylinder(s) 2a.

In this case, the first and second cylinders discharge the exhaust gas containing a large quantity of unburned fuel, whereas the third and fourth cylinders discharge the exhaust gas containing a large quantity of unburned air (oxygen). The exhaust gas discharged from the first and second cylinders (i.e., the exhaust gas containing unburned fuel) and the exhaust gas discharged from the third and fourth cylinders (i.e., the exhaust gas containing unburned air) are supplied through the exhaust branch pipes 13 to the exhaust pipe 14 upstream of the first exhaust-purifying catalyst 15.

The fuel and air contained in the exhaust gas are mixed to form an excellent combustible mixture within the first exhaust-purifying catalyst 15. The exhaust gas containing such combustible mixture flows out of the first exhaust-purifying catalyst 15 into the exhaust pipe 14 downstream thereof, and then, flow into the cone portion of the second exhaust-purifying catalyst 16. The combustible mixture flowing into the cone portion of the second exhaust-purifying catalyst 16 is burned by the ignition device 17 provided at the cone portion, and the catalyst body 16b of the second exhaust-purifying catalyst 16 is heated by the flame generated by such combustion.

Referring back to FIG. 15, the CPU 25 proceeds to Step S1504 subsequent to the process of Step S1503, and updates a counter value of the counter C for counting the execution time of the catalyst-heating process.

In Step S1505, the CPU 25 determines whether the updated counter value of the counter C is at least equal to the predetermined value CS or not, i.e., whether or not the catalyst-heating process has been executed at least for the predetermined time or longer.

When the CPU 25 determines in Step S1505 that the counter value of the counter C is less than the predetermined value CS, the CPU 25 repeats execution of Step S1504 and subsequent steps.

When the CPU 25 determines in Step S1505 that the counter value of the counter C is equal to the predetermined value CS or more, the CPU 25 proceeds to Step S1506, and terminates execution of the catalyst-heating process. The CPU 25 resets the counter value of the counter C to "zero," and controls the driving circuits 5 so as to render the internal combustion engine 1 into the normal operating state.

According to the above-described catalyst-heating control routine, the same effects as those of Embodiment 3 can be obtained.

What is claimed is:

1. A catalyst warming apparatus of an internal combustion engine, comprising:

a exhaust passage connected to the internal combustion engine;

a main exhaust-purifying catalyst provided in said exhaust passage for purifying exhaust gas flowing in said exhaust passage;

a sub exhaust-purifying catalyst provided in said exhaust passage upstream of said main exhaust-purifying catalyst for purifying the exhaust gas flowing in said exhaust passage;

ignition means provided in said exhaust passage between said main and sub exhaust-purifying catalysts; and combustible-component supply means for supplying fuel and air to the exhaust passage upstream of said sub exhaust-purifying catalyst, wherein the fuel and air supplied to the exhaust passage upstream of the sub exhaust-purifying catalyst by the combustible-component supply means are mixed in the sub exhaust-purifying catalyst, and enter the main exhaust-purifying catalyst without a special combustion chamber for mixing the fuel and air.

2. A catalyst warming apparatus of an internal combustion engine according to claim 1, further comprising flame back-flow preventing means provided in said exhaust passage upstream of said ignition means for preventing flame of a mixture ignited by said ignition means from flowing backward in said exhaust passage.

3. A catalyst warming apparatus of an internal combustion engine according to claim 1, wherein the exhaust passage formed in said sub exhaust-purifying catalyst has a diameter equal to or less than a flame-quenching diameter.

4. A catalyst warming apparatus of an internal combustion engine according to claim 1, wherein said main exhaust-purifying catalyst includes a porous base material including a flow passage having its upstream end opened and downstream end closed, and a flow passage having its upstream end closed and downstream end opened, wherein the former flow passage and the latter flow passage are alternately arranged in a honeycomb pattern.

5. A catalyst warming apparatus of an internal combustion engine according to claim 1, wherein said ignition means is disposed such that flame resulting from ignition of a combustible mixture is produced in a portion upstream of a catalyst carrier within said main exhaust-purifying catalyst.

6. A catalyst warming apparatus of an internal combustion engine according to claim 5, wherein the portion upstream of the catalyst carrier within said main exhaust-purifying catalyst has a heat insulated structure.

7. A catalyst warming apparatus of an internal combustion engine according to claim 1, further comprising exhaust throttling means for throttling a flow rate of the exhaust gas flowing through said exhaust passage when said combustible-component supply means is supplying the fuel and air to the exhaust passage upstream of said sub exhaust-purifying catalyst.

8. A catalyst warming apparatus of an internal combustion engine according to claim 7, wherein said exhaust throttling means is provided in said exhaust passage downstream of said main exhaust-purifying catalyst.

* * * * *

UNITED STATES PATENT AND TRADEMARK OFFICE
CERTIFICATE OF CORRECTION

PATENT NO. : 6,481,200 B1
DATED : November 19, 2002
INVENTOR(S) : Shinya Hirota et al.

It is certified that error appears in the above-identified patent and that said Letters Patent is hereby corrected as shown below:

<u>Column 28,</u>
Line 11, at the end of the claim, after "air", insert the word -- and --, and insert the following subparagraph immediately thereafter:
 -- wherein said combustible-component supply means supplies the fuel and air to the exhaust passage upstream of said sub exhaust-purifying catalyst by allowing actuation of a fuel injection valve in every cylinder of said internal combustion engine, while inhibiting actuation of a spark plug in every cylinder during cranking of said internal combustion engine immediately before completion of starting of said internal combustion engine --.

Signed and Sealed this

Third Day of June, 2003

JAMES E. ROGAN
*Director of the United States Patent and Trademark Office*